US008498335B2

(12) United States Patent
Holcomb et al.

(10) Patent No.: US 8,498,335 B2
(45) Date of Patent: Jul. 30, 2013

(54) ADAPTIVE DEADZONE SIZE ADJUSTMENT IN QUANTIZATION

(75) Inventors: Thomas W. Holcomb, Bothell, WA (US); Minghui Xia, Bellevue, WA (US); Chih-Lung Lin, Redmond, WA (US); Cheng Chang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1628 days.

(21) Appl. No.: 11/728,895

(22) Filed: Mar. 26, 2007

(65) Prior Publication Data

US 2008/0240235 A1    Oct. 2, 2008

(51) Int. Cl.
*H04N 11/02* (2006.01)
*H04N 7/24* (2011.01)

(52) U.S. Cl.
USPC .............................. 375/240.03; 375/E07.003

(58) Field of Classification Search
USPC ......................................... 375/240.03, E7.003
See application file for complete search history.

(56) References Cited

U.S. PATENT DOCUMENTS

| | | | |
|---|---|---|---|
| 762,026 A * | 6/1904 | Connstein | 435/136 |
| 4,583,114 A | 4/1986 | Catros | |
| 4,679,079 A | 7/1987 | Catros et al. | |
| 4,774,574 A | 9/1988 | Daly et al. | |
| 4,821,119 A | 4/1989 | Gharavi | |
| 4,862,264 A | 8/1989 | Wells et al. | |
| 4,965,830 A | 10/1990 | Barham et al. | |
| 4,992,889 A | 2/1991 | Yamagami et al. | |
| 5,072,295 A | 12/1991 | Murakami et al. | |
| 5,128,758 A | 7/1992 | Azadegan et al. | |
| 5,136,377 A | 8/1992 | Johnston et al. | |
| 5,144,426 A | 9/1992 | Tanaka et al. | |
| 5,146,324 A | 9/1992 | Miller et al. | |
| 5,179,442 A | 1/1993 | Azadegan et al. | |
| 5,237,410 A | 8/1993 | Inoue | |
| 5,241,395 A | 8/1993 | Chen | |
| 5,253,058 A | 10/1993 | Gharavi | |
| 5,263,088 A | 11/1993 | Hazu et al. | |

(Continued)

FOREIGN PATENT DOCUMENTS

| | | |
|---|---|---|
| CA | 1327074 | 2/1994 |
| EP | 0932306 | 7/1999 |

(Continued)

OTHER PUBLICATIONS

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

(Continued)

*Primary Examiner* — Saleh Najjar
*Assistant Examiner* — Shu Chun Gao
(74) *Attorney, Agent, or Firm* — Klarquist Sparkman, LLP

(57) ABSTRACT

Techniques and tools are described for adaptive deadzone ("DZ") resizing during quantization. For example, in some embodiments, for quantization of an AC frequency coefficient of a block, a video encoder adjusts DZ size of a selected quantizer depending on the texture of the block. In other embodiments, a video encoder adjusts DZ size depending on the frequency of a coefficient being quantized. In still other embodiments, for quantization of an AC frequency coefficient of a block, a video encoder adjusts DZ size depending on the texture of the block and the frequency of the coefficient being quantized.

19 Claims, 10 Drawing Sheets

Software 680 implementing encoder or other tool that adjusts DZ size to adapt to texture level and/or coefficient frequency

U.S. PATENT DOCUMENTS

| | | |
|---|---|---|
| 5,301,242 A | 4/1994 | Gonzales et al. |
| 5,303,058 A | 4/1994 | Fukuda et al. |
| 5,317,396 A | 5/1994 | Fujinami |
| 5,317,672 A | 5/1994 | Crossman et al. |
| 5,333,212 A | 7/1994 | Ligtenberg |
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,473,377 A | 12/1995 | Kim |
| 5,481,553 A | 1/1996 | Suzuki et al. |
| 5,506,916 A | 4/1996 | Nishihara et al. |
| 5,510,785 A | 4/1996 | Segawa et al. |
| 5,537,440 A * | 7/1996 | Eyuboglu et al. ............ 375/245 |
| 5,537,493 A | 7/1996 | Wilkinson |
| 5,539,469 A | 7/1996 | Jung |
| 5,559,557 A | 9/1996 | Kato |
| 5,565,920 A | 10/1996 | Lee et al. |
| 5,587,708 A | 12/1996 | Chiu |
| 5,590,139 A | 12/1996 | Suzuki et al. |
| 5,606,371 A | 2/1997 | Gunnewick et al. |
| 5,623,424 A | 4/1997 | Azadegan et al. |
| 5,629,779 A | 5/1997 | Jeon |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A * | 3/1998 | Hibi et al. ............... 375/240.04 |
| 5,724,456 A * | 3/1998 | Boyack et al. ............... 382/274 |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A | 3/1999 | Legall |
| 5,880,775 A | 3/1999 | Ross |
| 5,883,672 A | 3/1999 | Suzuki et al. |
| 5,926,791 A | 7/1999 | Ogata et al. |
| 5,969,764 A | 10/1999 | Sun et al. |
| 5,970,173 A | 10/1999 | Lee et al. |
| 5,990,957 A | 11/1999 | Ryoo |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Fujiwara |
| 6,088,392 A | 7/2000 | Rosenberg |
| 6,091,777 A | 7/2000 | Guetz et al. |
| 6,104,751 A | 8/2000 | Artieri |
| 6,118,817 A | 9/2000 | Wang |
| 6,118,903 A | 9/2000 | Liu |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 | 4/2002 | Florencio et al. |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,693,645 B2 | 2/2004 | Bourges-Sevenier |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,977,659 B2 | 12/2005 | Dumitras et al. |
| 6,983,018 B1 | 1/2006 | Lin et al. |
| 6,990,242 B2 | 1/2006 | Malvar |
| 7,016,546 B2 | 3/2006 | Fukuhara et al. |
| 7,020,204 B2 | 3/2006 | Auvray et al. |
| 7,027,506 B2 | 4/2006 | Lee et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |

| | | | |
|---|---|---|---|
| 7,099,389 B1 | 8/2006 | Yu et al. | |
| 7,099,515 B2 | 8/2006 | Lin et al. | |
| 7,110,455 B2 | 9/2006 | Wu et al. | |
| 7,162,096 B1 | 1/2007 | Horowitz | |
| 7,200,277 B2 | 4/2007 | Joshi et al. | |
| 7,280,700 B2* | 10/2007 | Tourapis et al. | 382/238 |
| 7,289,154 B2 | 10/2007 | Gindele | |
| 7,295,609 B2* | 11/2007 | Sato et al. | 375/240.03 |
| 7,301,999 B2 | 11/2007 | Filippini et al. | |
| 7,307,639 B1 | 12/2007 | Dumitras et al. | |
| 7,356,085 B2 | 4/2008 | Gavrilescu et al. | |
| 7,463,780 B2 | 12/2008 | Fukuhara et al. | |
| 7,471,830 B2 | 12/2008 | Lim et al. | |
| 7,580,584 B2* | 8/2009 | Holcomb et al. | 382/239 |
| 7,738,554 B2* | 6/2010 | Lin et al. | 375/240.03 |
| 7,778,476 B2* | 8/2010 | Alvarez et al. | 382/236 |
| 7,801,383 B2* | 9/2010 | Sullivan | 382/251 |
| 7,869,517 B2 | 1/2011 | Ghanbari | |
| 7,889,790 B2 | 2/2011 | Sun | |
| 7,995,649 B2 | 8/2011 | Zuo et al. | |
| 2001/0048718 A1 | 12/2001 | Bruls et al. | |
| 2002/0021756 A1 | 2/2002 | Jayant et al. | |
| 2002/0024999 A1 | 2/2002 | Yamaguchi et al. | |
| 2002/0044602 A1 | 4/2002 | Ohki | |
| 2002/0118748 A1 | 8/2002 | Inomata et al. | |
| 2002/0118884 A1 | 8/2002 | Cho et al. | |
| 2002/0136297 A1 | 9/2002 | Shimada et al. | |
| 2002/0136308 A1 | 9/2002 | Le Maguet et al. | |
| 2002/0154693 A1 | 10/2002 | Demos et al. | |
| 2002/0186890 A1 | 12/2002 | Lee et al. | |
| 2003/0021482 A1 | 1/2003 | Lan et al. | |
| 2003/0053702 A1 | 3/2003 | Hu | |
| 2003/0095599 A1 | 5/2003 | Lee et al. | |
| 2003/0103677 A1 | 6/2003 | Tastl et al. | |
| 2003/0108100 A1 | 6/2003 | Sekiguchi et al. | |
| 2003/0113026 A1 | 6/2003 | Srinivasan et al. | |
| 2003/0128754 A1 | 7/2003 | Akimoto et al. | |
| 2003/0128756 A1 | 7/2003 | Oktem | |
| 2003/0138150 A1 | 7/2003 | Srinivasan | |
| 2003/0185420 A1 | 10/2003 | Sefcik et al. | |
| 2003/0194010 A1 | 10/2003 | Srinivasan et al. | |
| 2003/0206582 A1 | 11/2003 | Srinivasan et al. | |
| 2003/0215011 A1 | 11/2003 | Wang et al. | |
| 2003/0219073 A1 | 11/2003 | Lee et al. | |
| 2003/0223493 A1* | 12/2003 | Ye et al. | 375/240.03 |
| 2003/0235247 A1 | 12/2003 | Wu et al. | |
| 2004/0008901 A1 | 1/2004 | Avinash | |
| 2004/0022316 A1 | 2/2004 | Ueda et al. | |
| 2004/0036692 A1 | 2/2004 | Alcorn et al. | |
| 2004/0090397 A1 | 5/2004 | Doyen et al. | |
| 2004/0091168 A1 | 5/2004 | Jones et al. | |
| 2004/0151243 A1 | 8/2004 | Bhaskaran et al. | |
| 2004/0158719 A1 | 8/2004 | Lee et al. | |
| 2004/0190610 A1 | 9/2004 | Song et al. | |
| 2004/0202376 A1 | 10/2004 | Schwartz et al. | |
| 2004/0228406 A1 | 11/2004 | Song | |
| 2004/0264568 A1 | 12/2004 | Florencio | |
| 2004/0264580 A1 | 12/2004 | Chiang Wei Yin et al. | |
| 2005/0002575 A1 | 1/2005 | Joshi et al. | |
| 2005/0008075 A1 | 1/2005 | Chang | |
| 2005/0013365 A1 | 1/2005 | Mukerjee et al. | |
| 2005/0013497 A1 | 1/2005 | Hsu et al. | |
| 2005/0013498 A1 | 1/2005 | Srinivasan et al. | |
| 2005/0013500 A1 | 1/2005 | Lee et al. | |
| 2005/0015246 A1 | 1/2005 | Thumpudi et al. | |
| 2005/0015259 A1 | 1/2005 | Thumpudi et al. | |
| 2005/0024487 A1 | 2/2005 | Chen | |
| 2005/0031034 A1 | 2/2005 | Kamaci et al. | |
| 2005/0036698 A1 | 2/2005 | Beom | |
| 2005/0036699 A1* | 2/2005 | Holcomb et al. | 382/239 |
| 2005/0041738 A1* | 2/2005 | Lin et al. | 375/240.03 |
| 2005/0052294 A1 | 3/2005 | Liang et al. | |
| 2005/0053151 A1 | 3/2005 | Lin et al. | |
| 2005/0053158 A1 | 3/2005 | Regunathan et al. | |
| 2005/0084009 A1 | 4/2005 | Furukawa et al. | |
| 2005/0084013 A1 | 4/2005 | Wang et al. | |
| 2005/0094731 A1 | 5/2005 | Xu et al. | |
| 2005/0105612 A1 | 5/2005 | Sung et al. | |
| 2005/0105622 A1 | 5/2005 | Gokhale | |
| 2005/0123274 A1 | 6/2005 | Crinon et al. | |
| 2005/0135484 A1 | 6/2005 | Lee et al. | |
| 2005/0147163 A1 | 7/2005 | Li et al. | |
| 2005/0152451 A1 | 7/2005 | Byun | |
| 2005/0180500 A1 | 8/2005 | Chiang et al. | |
| 2005/0180502 A1 | 8/2005 | Puri | |
| 2005/0190836 A1 | 9/2005 | Lu et al. | |
| 2005/0207492 A1 | 9/2005 | Pao | |
| 2005/0232501 A1 | 10/2005 | Mukerjee | |
| 2005/0238096 A1* | 10/2005 | Holcomb et al. | 375/240.03 |
| 2005/0254719 A1 | 11/2005 | Sullivan | |
| 2005/0259729 A1 | 11/2005 | Sun | |
| 2005/0276493 A1 | 12/2005 | Xin et al. | |
| 2006/0013307 A1 | 1/2006 | Olivier et al. | |
| 2006/0013309 A1 | 1/2006 | Ha et al. | |
| 2006/0018552 A1 | 1/2006 | Malayath et al. | |
| 2006/0034368 A1 | 2/2006 | Klivington | |
| 2006/0038826 A1 | 2/2006 | Daly | |
| 2006/0056508 A1 | 3/2006 | Lafon et al. | |
| 2006/0071825 A1 | 4/2006 | Demos | |
| 2006/0083308 A1 | 4/2006 | Schwarz et al. | |
| 2006/0088098 A1 | 4/2006 | Vehvilainen | |
| 2006/0098733 A1* | 5/2006 | Matsumura et al. | 375/240.03 |
| 2006/0104350 A1* | 5/2006 | Liu | 375/240.03 |
| 2006/0104527 A1 | 5/2006 | Koto et al. | |
| 2006/0126724 A1* | 6/2006 | Cote et al. | 375/240.03 |
| 2006/0126728 A1 | 6/2006 | Yu et al. | |
| 2006/0133478 A1 | 6/2006 | Wen | |
| 2006/0133479 A1 | 6/2006 | Chen et al. | |
| 2006/0140267 A1 | 6/2006 | He et al. | |
| 2006/0165176 A1 | 7/2006 | Raveendran et al. | |
| 2006/0188014 A1 | 8/2006 | Civanlar et al. | |
| 2006/0197777 A1 | 9/2006 | Cha et al. | |
| 2006/0227868 A1 | 10/2006 | Chen et al. | |
| 2006/0238444 A1 | 10/2006 | Wang et al. | |
| 2006/0239576 A1 | 10/2006 | Mukherjee | |
| 2006/0245506 A1 | 11/2006 | Lin et al. | |
| 2006/0256851 A1 | 11/2006 | Wang et al. | |
| 2006/0256867 A1 | 11/2006 | Turaga et al. | |
| 2006/0257037 A1 | 11/2006 | Samadani | |
| 2006/0268990 A1* | 11/2006 | Lin et al. | 375/240.24 |
| 2006/0268991 A1 | 11/2006 | Segall et al. | |
| 2007/0002946 A1 | 1/2007 | Bouton et al. | |
| 2007/0009039 A1 | 1/2007 | Ryu | |
| 2007/0009042 A1 | 1/2007 | Craig et al. | |
| 2007/0053603 A1 | 3/2007 | Monro | |
| 2007/0081586 A1 | 4/2007 | Raveendran et al. | |
| 2007/0081588 A1 | 4/2007 | Raveendran et al. | |
| 2007/0140333 A1* | 6/2007 | Chono et al. | 375/240.03 |
| 2007/0147497 A1 | 6/2007 | Bao et al. | |
| 2007/0160138 A1* | 7/2007 | Wedi et al. | 375/240.03 |
| 2007/0160151 A1 | 7/2007 | Bolton et al. | |
| 2007/0189626 A1 | 8/2007 | Tanizawa et al. | |
| 2007/0201553 A1 | 8/2007 | Shindo | |
| 2007/0230565 A1 | 10/2007 | Tourapis et al. | |
| 2007/0237221 A1 | 10/2007 | Hsu et al. | |
| 2007/0237222 A1 | 10/2007 | Xia et al. | |
| 2007/0237236 A1 | 10/2007 | Chang et al. | |
| 2007/0237237 A1 | 10/2007 | Chang et al. | |
| 2007/0248163 A1 | 10/2007 | Zuo et al. | |
| 2007/0248164 A1* | 10/2007 | Zuo et al. | 375/240.2 |
| 2007/0258518 A1 | 11/2007 | Tu et al. | |
| 2007/0258519 A1 | 11/2007 | Srinivasan | |
| 2008/0008394 A1 | 1/2008 | Segall | |
| 2008/0031346 A1 | 2/2008 | Segall | |
| 2008/0068446 A1 | 3/2008 | Barkley et al. | |
| 2008/0080615 A1* | 4/2008 | Tourapis et al. | 375/240.03 |
| 2008/0089410 A1 | 4/2008 | Lu et al. | |
| 2008/0101465 A1* | 5/2008 | Chono et al. | 375/240.03 |
| 2008/0144951 A1* | 6/2008 | Zhang | 382/239 |
| 2008/0187042 A1 | 8/2008 | Jasinschi | |
| 2008/0192822 A1 | 8/2008 | Chang et al. | |
| 2008/0240235 A1 | 10/2008 | Holcomb et al. | |
| 2008/0240250 A1 | 10/2008 | Lin et al. | |
| 2008/0240257 A1 | 10/2008 | Chang et al. | |
| 2008/0260278 A1 | 10/2008 | Zuo et al. | |
| 2008/0304562 A1 | 12/2008 | Chang et al. | |
| 2009/0207919 A1 | 8/2009 | Yin et al. | |
| 2009/0213930 A1 | 8/2009 | Ye et al. | |

| | | | |
|---|---|---|---|
| 2009/0245587 A1 | 10/2009 | Holcomb et al. | |
| 2009/0290635 A1 | 11/2009 | Kim et al. | |
| 2009/0296808 A1 | 12/2009 | Regunathan et al. | |
| 2010/0177826 A1 | 7/2010 | Bhaumik et al. | |

FOREIGN PATENT DOCUMENTS

| | | |
|---|---|---|
| EP | 1465349 | 10/2004 |
| EP | 1871113 | 12/2007 |
| GB | 897363 | 5/1962 |
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2001-358948 | 12/2001 |
| JP | 2002-058029 | 2/2002 |
| JP | 2003061090 | 2/2003 |
| JP | 2003-230142 | 8/2003 |
| JP | 2004-023288 | 1/2004 |
| JP | 2004-247889 | 9/2004 |
| JP | 6-296275 | 10/2004 |
| JP | 2005-260467 | 9/2005 |
| JP | 2007-281949 | 10/2007 |
| KR | 132895 | 10/1998 |
| RU | 2119269 | 9/1998 |
| RU | 2119727 | 9/1998 |
| RU | 2127962 | 3/1999 |
| WO | WO 93/09636 | 5/1993 |
| WO | WO 97/21302 | 6/1997 |
| WO | WO 99/25121 | 5/1999 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 02/080575 | 10/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 | 10/2006 |
| WO | WO 2007/015047 | 2/2007 |
| WO | WO 2007/130580 | 11/2007 |

OTHER PUBLICATIONS

Augustine et al., "Region of Interest Editing of MPEG-2 Video Streams in the Compressed Domain," *2004 IEEE Int'l Conf. on Multimedia and Expo: ICME '04*, vol. 1, Issue 27-30, pp. 559-562 (Jun. 2004).

Bist et al., "Adaptive Quantization for Low Bit Rate Video Coding," *Proc. 1998 Int'l Conf. on Image Processing (ICIP 98)*, pp. 925-928 (Oct. 1998).

Chang et al., "Adaptive Wavelet Thresholding for Image Denoising and Compression," *IEEE Trans on Image Processing*, vol. 9, No. 9, pp. 1532-1546 (Sep. 2000).

Chrysafis et al., "Context-based Adaptive Image Coding," *Proc. of the 30th Asilomar Conf. on Signals, Systems, and Computers*, 5 pp. (Nov. 1996).

De Simone, et al., "A comparative study of JPEG 2000, AVC/H.264, and HD Photo," *SPIE Optics and Photonics, Applications of Digital Image Processing XXX*, 12 pp. (Aug. 2007).

Farvardin et al., "Optimum quantizer performance for a class of non-Gaussian memoryless sources," *IEEE Trans. Inform. Theory*, vol. IT-30, No. 3, pp. 485-497 (May 1984).

Flierl et al., "A Video Codec Incorporating Block-Based Multi-Hypothesis Motion-Compensated Prediction," in *Proceedings of the SPIE Conference on Visual Communications and Image Processing*, Perth, Australia, vol. 4067, pp. 238-249 (Jun. 2000).

Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).

Foos et al., "JPEG 2000 compression of medical imagery," *Proc. SPIE*, vol. 3980, pp. 85-96 (Feb. 2000).

Garrigues et al., "Atom position coding in a matching pursuit based video coder," *Lecture Notes in Computer Science*, 4 pp. (Sep. 2005).

Gavrilescu et al., "Embedded Multiple Description Scalar Quantizers," *IEE Electronics Letters*, vol. 39, No. 13, 12 pp. (Jun. 2003).

Gish et al., "Asymptotically efficient quantizing," *IEEE Trans. Inform. Theory*, vol. IT-14, No. 5 (Sep. 1968).

Golner et al., "Region Based Variable Quantization for JPEG Image Compression," *IEEE Symp. on Circuits and Systems*, pp. 604-607 (Aug. 2000).

Golston et al., "Video codecs tutorial: Trade-offs with H.264, VC-1 and other advanced codecs," *Video/Imaging Design Line*, 9 pp. (Mar. 2006).

"H.264 & IPTV Over DSL—Enabling New Telco Revenue Opportunities," *White Paper*, 12 pp. (May 15, 2004).

Hannuksela et al., "Sub-picture: ROI coding and unequal error protection," Proc. 2002 Int'l Conf. on Image Processing, vol. 3, Issue 24-28, pp. 537-540 (Jun. 2002).

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).

"ISO/IEC 13818-2. Generic coding of moving pictures and associated audio information," MPEG (Moving Pictures Expert Group), International Organization for Standardization, MPEG2 Video, 23 pp. (Dec. 2000).

ISO/IEC, "14496-2: Information Technology—Coding of Audio-Visual Objects—Part 2: Visual," 724 pp. (Jun. 2004).

ITU-T, "ITU-T Recommendation H.261: Video Codec for Audiovisual Services at $p \times 64$ kbits," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," *IEEE Signal Proc. Letters*, vol. SPL-2, No. 5, pp. 81-82 (May 1995).

Kim et al., "Still image coding based on vector quantization and fractal approximation," *IEEE Transactions on Image Processing*, vol. 5, No. 4, pp. 587-597 (Apr. 1996).

Kopp, "Lossless Wavelet Based Image Compression with Adaptive 2D Decomposition," *Proc. 4th Int'l Conf. in Central Europe on Computer Graphics and Visualization 96*, pp. 141-149 (Feb. 12-16, 1996).

Lam et al., "A mathematical analysis of the DCT coefficient distributions for images," *IEEE Trans. Image Proc.*, vol. IP-9, No. 10, pp. 1661-1666 (Oct. 2000).

LeGall, "MPEG: A Video Compression Standard for Multimedia Application," *Communications of the ACM*, vol. 34, No. 4, pp. 47-58 (Apr. 1991).

LeGall, "The MPEG Video Compression Algorithm," *Signal Processing: Image Communication 4*, vol. 4, No. 2, pp. 129-140 (Apr. 1992).

LeGall et al., "Transmission of HDTV signals under 140 Mbit/s using a subband decomposition and Discrete Cosine Transform coding," in *Signal Processing of HDTV*, Elsevier, Amsterdam, pp. 287-293 (Oct. 1988).

Lei et al., "Rate Adaptation Transcoding for Precoded Video Streams," 13 pp. (month unknown, 2000).

Limb, "A Picture-Coding Algorithm for the Merli Scan," *IEEE Transactions on Communications*, pp. 300-305 (Apr. 1973).

Lin et al, "Low-complexity face-assisted coding scheme for low bit rate video telephony," *IEICE Trans. Inf. & Sys.*, vol. E86-D, No. 1, pp. 101-108 (Jan. 2003).

Lin et al, "Low-complexity face-assisted video coding," *Proc. 2000 Int'l Conf. on Image Processing*, vol. 2, pp. 207-210 (Sep. 2000).

Lloyd, "Least squares quantization in PCM," *IEEE Trans. Inform. Theory*, vol. IT-28, No. 2, pp. 7-12 (Mar. 1982) (reprint of work originally presented in Jul. 1957).

Loomis, "Using the Advanced Settings of the Windows Media Video 9 Advanced Profile Codec," 13 pp. (Document dated Apr. 2006) [Downloaded from the World Wide Web on May 31, 2007].

Luo et al., "A Scene Adaptive and Signal Adaptive Quantization for Subband Image and Video Compression Using Wavelets," *IEEE Trans. On Circuits and Systems for Video Tech.*, vol. 7, No. 2, pp. 343-357 (Apr. 1997).

Mallat, "A theory for multiresolution signal decomposition: the wavelet representation," *IEEE Trans. Pattern Anal. And Machine Intell.*, vol. PAMI-11, No. 7, pp. 674-692 (Jul. 1989).

Masala et al., "Perceptually Optimized MPEG Compression of Synthetic Video Sequences," *Proc. ICIP*, pp. I-601-I-604 (Sep. 2005).

Max, "Quantizing for minimum distortion," *IEEE Trans. Inform. Theory*, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitra et al., "Two-Stage Color Palettization for Error Diffusion," *Proceedings of SPIE*, pp. 207-217 (Jun. 2002).

Mook, "Next-Gen Windows Media Player Leaks to the Web," *BetaNews*, 17 pp. (Jul. 19, 2002) [Downloaded from the World Wide Web on Aug. 8, 2003].

Muller, "Distribution shape of two-dimensional DCT coefficients of natural images," *IEE Electronics Letters*, vol. 29, No. 22 (Oct. 1993).

Murakami et al., "Comparison between DPCM and Hadamard transform coding in the composite coding of the NTSC color TV signal," *IEEE Trans. On Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).

Park et al., "A post processing method for reducing quantization effects in low bit-rate moving picture coding," *IEEE Trans. Circuits Syst. Video Technology*, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).

Reininger et al., "Distribution of two-dimensional DCT coefficients for images," *IEEE Trans. On Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schallauer et al., "PRESTO—Preservation Technologies for European Broadcast Archives, D5.4—High Quality Compression for Film and Video," 80 pp. (Sep. 18, 2002).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shen et al., "Rate-Distortion Optimization for Fast Hierarchical B-Picture Transcoding," *IEEE*, pp. 5279-5282 (May 2006).

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sony Electronics Inc., "Sony Vizaro DVD Encoder System DVA-V700," 4 pp. (Apr. 2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Tsang et al., "Fuzzy Based Rate Control for Real-Time MPEG Video," *IEEE Transactions on Fuzzy Systems*, pp. 504-516 (Nov. 1998).

Wang, et al., "A Framework for Adaptive Scalable Video Coding Using Wyner-Ziv Techniques," *EURASIP Journal on Applied Signal Processing*, pp. 1-18 (month unknown, 2006).

Watson et al., "Visibility of Wavelet Quantization Noise," *IEEE Trans. on Image Processing*, vol. 6, No. 8, pp. 1164-1175 (Aug. 1997).

Wien, "Variable Block-Size Transforms for Hybrid Video Coding," Dissertation, 182 pp. (Feb. 2004).

Wu et al., "Context-Based, Adaptive, Lossless Image Coding," *IEEE Trans. Communications*, vol. 45, pp. 437-444 (Apr. 1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Xiong et al., "Wavelet Packet Image Coding Using Space-Frequency Quantization," *IEEE Transactions on Image Processing*, vol. 7, No. 6, pp. 892-898 (Jun. 1998).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (Nov. 1998).

Zaid et al., "Wavelet Image Coding with Adaptive Thresholding," 4 pp. (Jul. 2002).

Zhang et al., "Adaptive Field/Frame Selection for High Compression Coding," *SPIE Conf. on Image and Video Communications and Processing*, 13 pp. (Jan. 2003).

Calderbank et al., "Wavelet transforms that map integers to integers," Mathematics Subject Classification, Aug. 1996, 39 pages.

Donoho et al., "Data compression and Harmonic Analysis," IEEE transaction on information theory, vol. 44, No. 6, Oct. 1998, pp. 2435-2476.

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "CCITT Recommendation T.81: Information Technology—Digital Compresion and Coding of Continuous-Tone Still Images—Requirements and Guidelines," 190 pp. (Sep. 1992).

ITU-T, "ITU-T Recommendation T.84: Terminals for Telematic Services—Information Technology—Digital Compression and Coding of Continuous-Tone Still Images: Extensions," 84 pp. (Jul. 1996).

ITU-T, "ITU-T Recommendation T.801: JPEG 2000 image coding system: Extensions," 334 pp. (Aug. 2002).

Man et al., "Three-Dimensional Subband Coding Techniques for Wireless Video Communications," IEEE Trans. on Circuits and Systems for Video Technology, vol. 12, No. 6, pp. 386-397 (Jun. 2002).

Marcellin et al., "An overview of quantization in JPEG 2000," Signal Processing: Image Communication, vol. 17, pp. 73-84 (Jan. 2002).

Srinivasan et al., "HD Photo: A new image coding technology for digital photography," Proc. of SPIE, Vo. 6696, 19 pp. (Jan. 2007).

Tong, "A perceptually adaptive JPEG coder," Thesis, University of Toronto, 124 pp. (1997).

Watson, "Perceptual Optimization of DCT Color Quantization Matrices," IEEE Conf. on Image Processing, pp. 100-104 (Nov. 1994).

Yoo et al., "Adaptive Quantization of Image Subbands with Efficient Overhead Rate Selection," IEEE Conf. on Image Processing, pp. 361-364 (Sep. 1996).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

Lee et al., "Spatio-Temporal Model-Assisted Compatible Coding for Law and Very Low Bitrate Videotelephony," 3rd IEEE International Conference on Image Processing, 4 pages, Sep. 1996.

Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.

Richardson, H.264 and MPEG-4 Video Compression, pp. 50-56 and 187-196 (2003).

Eleftheriadis et al., "Dynamic Rate Shaping of Compressed Digital Video," IEEE Transactions on Multimedia, vol. 8, No. 2, Apr. 2006, pp. 297-314.

LoPresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

\* cited by examiner

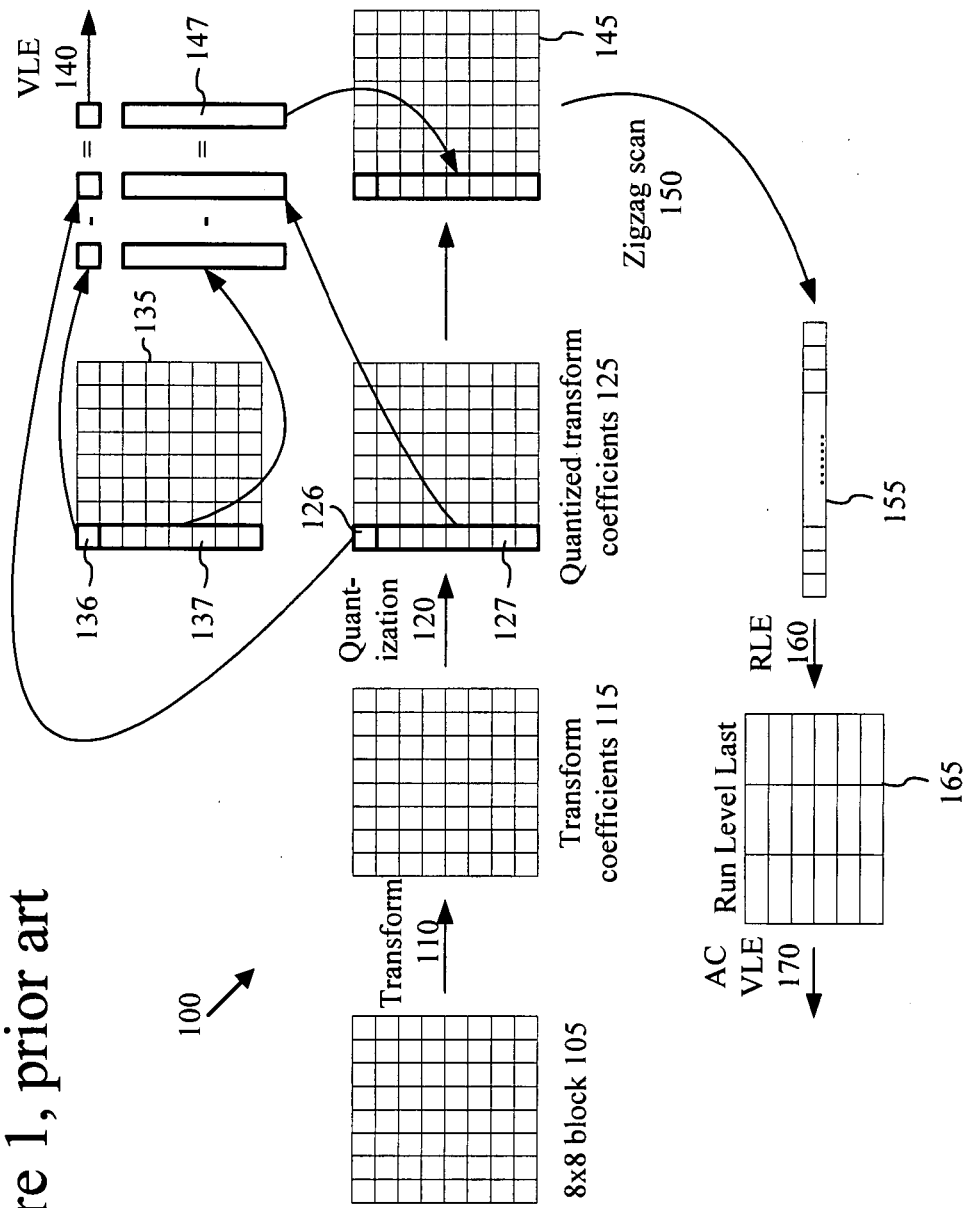
Figure 1, prior art

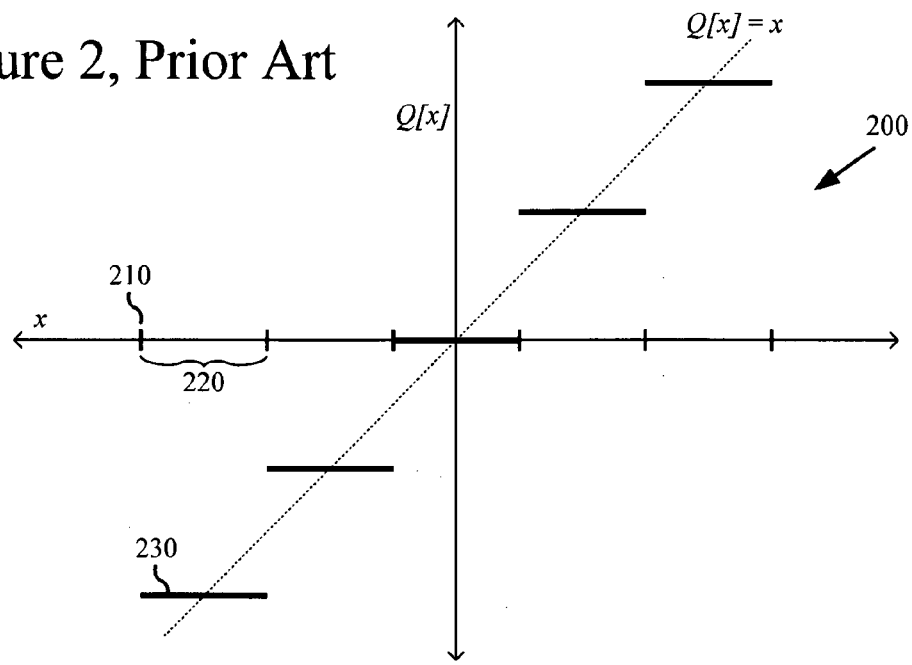
Figure 2, Prior Art
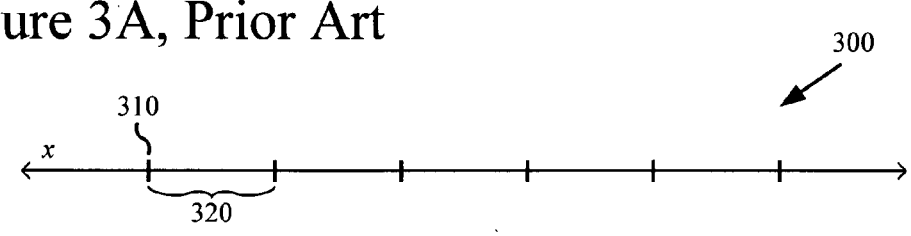
Figure 3A, Prior Art
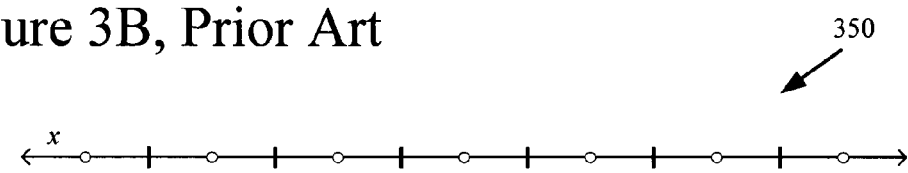
Figure 3B, Prior Art

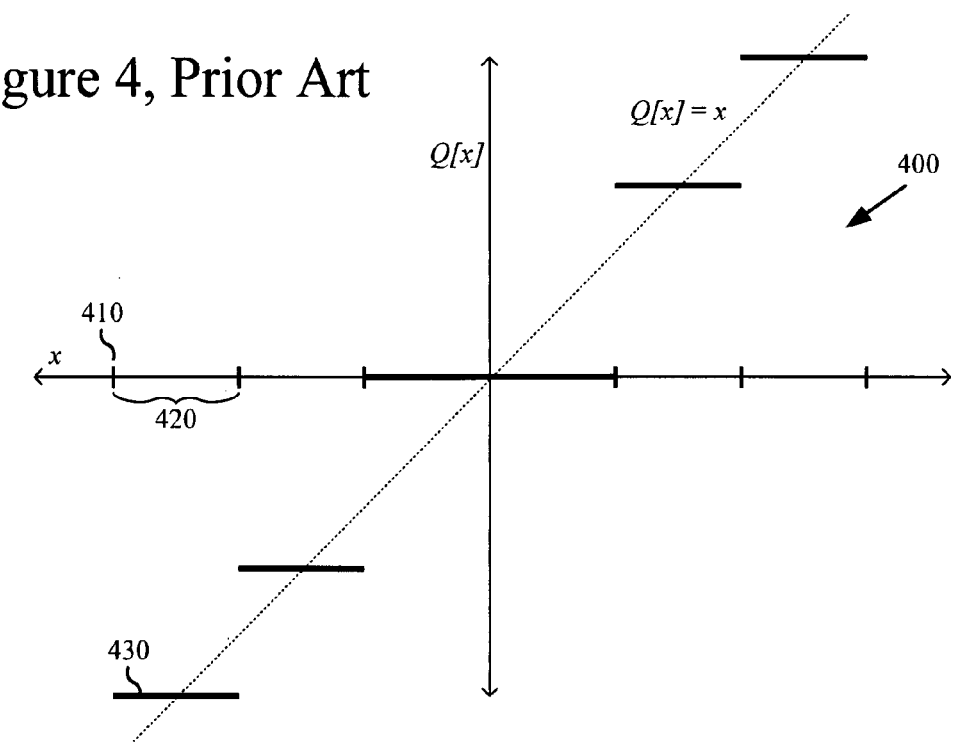
Figure 4, Prior Art
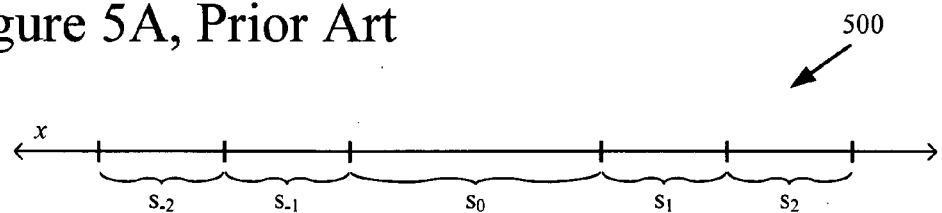
Figure 5A, Prior Art
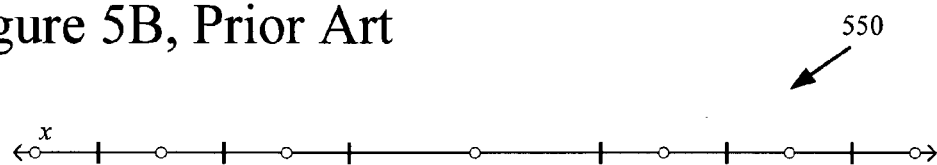
Figure 5B, Prior Art Software 680 implementing encoder or other tool that adjusts DZ size to adapt to texture level and/or coefficient frequency

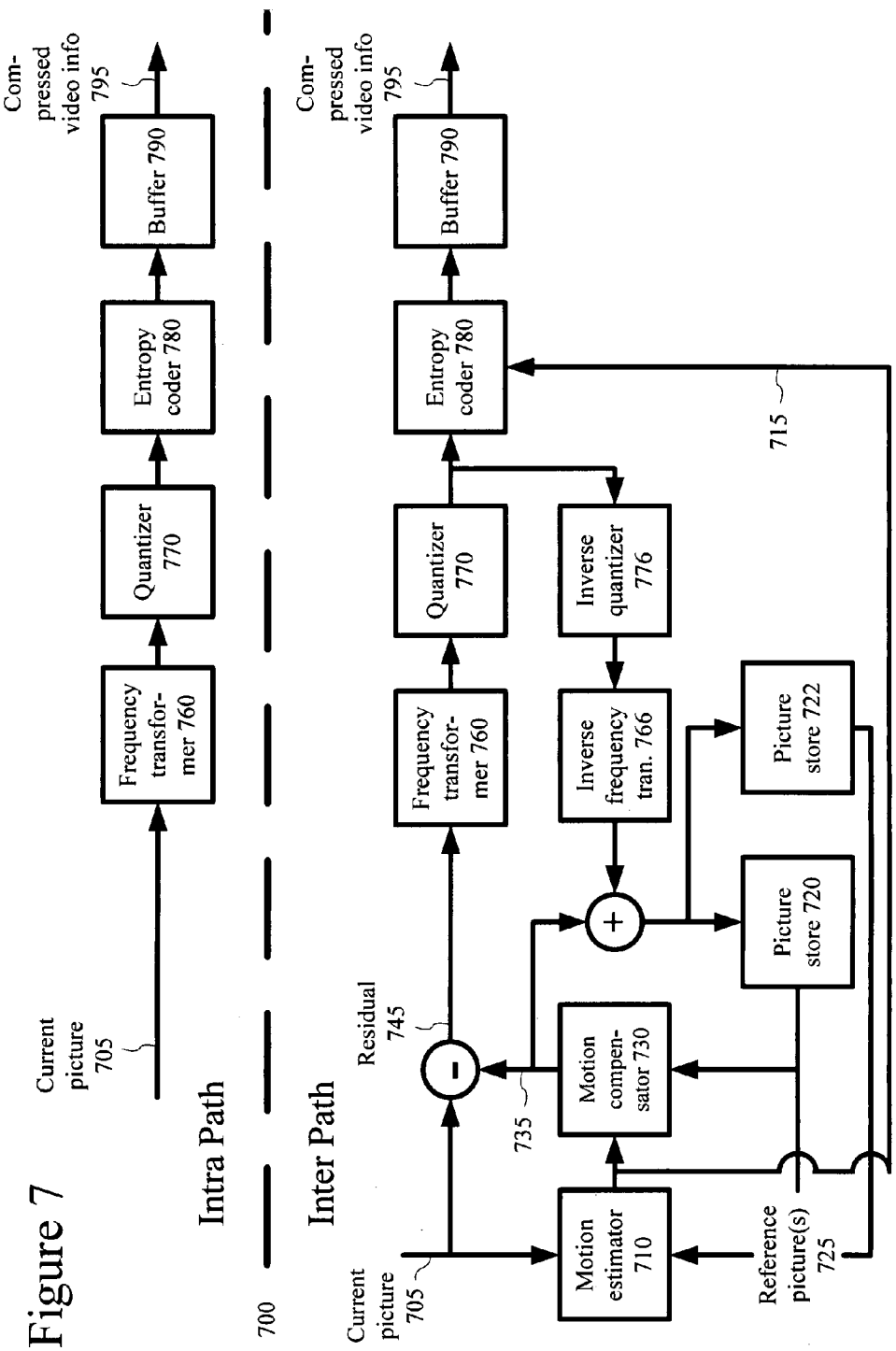

ADAPTIVE DEADZONE SIZE ADJUSTMENT IN QUANTIZATION

BACKGROUND

Digital video consumes large amounts of storage and transmission capacity. Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

In general, video compression techniques include "intra-picture" compression and "inter-picture" compression. Intra-picture compression techniques compress an individual picture, and inter-picture compression techniques compress a picture with reference to a preceding and/or following picture (often called a reference or anchor picture) or pictures.

I. Intra and Inter Compression.

FIG. 1 illustrates block-based intra compression in an example encoder. In particular, FIG. 1 illustrates intra compression of an 8×8 block (105) of samples by the encoder. The encoder splits a picture into non-overlapping 8×8 blocks of samples and applies a forward 8×8 frequency transform (110) (such as a discrete cosine transform ("DCT")) to individual blocks such as the block (105). (In some cases, the encoder subtracts 128 from the 8-bit sample values before the frequency transform.) The frequency transform (110) maps the sample values to transform coefficients, which are coefficients of basis functions that correspond to frequency components. In typical encoding scenarios, a relatively small number of frequency coefficients capture much of the energy or signal content in video.

The encoder quantizes (120) the transform coefficients (115), resulting in an 8×8 block of quantized transform coefficients (125). With quantization, the encoder essentially trades off quality and bit rate. More specifically, quantization can affect the fidelity with which the transform coefficients are encoded, which in turn can affect bit rate. Coarser quantization tends to decrease fidelity to the original transform coefficients as the coefficients are more coarsely approximated. Bit rate also decreases, however, when decreased complexity can be exploited with lossless compression. Conversely, finer quantization tends to preserve fidelity and quality but result in higher bit rates. Different encoders use different parameters for quantization. In most encoders, a step size of quantization is set for a block, picture, or other unit of video. Some encoders quantize coefficients differently within a given block, so as to apply relatively coarser quantization to perceptually less important coefficients, and a quantization matrix can be used to indicate the relative quantization weights. Or, apart from the rules used to reconstruct quantized values, some encoders define the thresholds according to which values are quantized so as to quantize values more aggressively.

Returning to FIG. 1, further encoding varies depending on whether a coefficient is a DC coefficient (the lowest frequency coefficient shown as the top left coefficient in the block (125)), an AC coefficient in the top row or left column in the block (125), or another AC coefficient. The encoder typically encodes the DC coefficient (126) as a differential from the reconstructed DC coefficient (136) of a neighboring 8×8 block. The encoder entropy encodes (140) the differential. The entropy encoder can encode the left column or top row of AC coefficients as differentials from AC coefficients a corresponding left column or top row of a neighboring 8×8 block. The encoder scans (150) the 8×8 block (145) of predicted, quantized AC coefficients into a one-dimensional array (155). The encoder then entropy encodes the scanned coefficients using a variation of run/level coding (160).

In corresponding decoding, a decoder produces a reconstructed version of the original 8×8 block. The decoder entropy decodes the quantized transform coefficients, scanning the quantized coefficients into a two-dimensional block, and performing AC prediction and/or DC prediction as needed. The decoder inverse quantizes the quantized transform coefficients of the block and applies an inverse frequency transform (such as an inverse DCT ("IDCT")) to the de-quantized transform coefficients, producing the reconstructed version of the original 8×8 block. (If the encoder subtracted 128 from the 8-bit sample values before the frequency transform, 128 is now added back to the sample values.) When a picture is used as a reference picture in subsequent motion compensation (see below), an encoder also reconstructs the picture.

Inter-picture compression techniques often use motion estimation and motion compensation to reduce bit rate by exploiting temporal redundancy in a video sequence. Motion estimation is a process for estimating motion between pictures. In general, motion compensation is a process of reconstructing pictures from reference picture(s) using motion data, producing motion-compensated predictions.

Whereas the example encoder divides an intra-coded picture into non-overlapping 8×8 blocks, the encoder more generally divides an inter-coded picture into rectangular, non-overlapping blocks of N×M samples, where N and M can be 4 or 8, so block size is 4×4, 4×8, 8×4 or 8×8. For a current unit (e.g., 8×8 block) being encoded, the encoder computes the sample-by-sample difference between the current unit and its motion-compensated prediction to determine a residual (also called error signal). The residual is frequency transformed, quantized, and entropy encoded.

If a predicted picture is used as a reference picture for subsequent motion compensation, the encoder reconstructs the predicted picture. When reconstructing residuals, the encoder reconstructs transform coefficients that were quantized and performs an inverse frequency transform. The encoder performs motion compensation to compute the motion-compensated predictors, and combines the predictors with the residuals. During decoding, a decoder typically entropy decodes information and performs analogous operations to reconstruct residuals, perform motion compensation, and combine the predictors with the reconstructed residuals.

II. Lossy Compression and Quantization.

Lossless compression reduces the bit rate of information by removing redundancy from the information without any reduction in fidelity. Lossless compression techniques reduce bit rate at no cost to quality, but can only reduce bit rate up to a certain point. Decreases in bit rate are limited by the inherent amount of variability in the statistical characterization of the input data, which is referred to as the source entropy.

In contrast, with lossy compression, quality suffers somewhat but the achievable decrease in bit rate is more dramatic. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression, in a system design in which the lossy compression establishes an approximation of the information and lossless compression techniques are applied to represent the approximation.

In general, an encoder varies quantization to trade off quality and bit rate. A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

A. Scalar Quantizers.

According to one possible definition, a scalar quantizer is an approximating functional mapping x→Q[x] of an input value x to a quantized value Q[x], sometimes called a reconstructed value. FIG. 2 shows a "staircase" I/O function (200) for a scalar quantizer. The horizontal axis is a number line for an input variable x, and the vertical axis indicates the corresponding quantized values Q[x]. The number line is partitioned by thresholds such as the threshold (210). Each value of x within a given range between a pair of adjacent thresholds is assigned the same quantized value Q[x]. For example, each value of x within the range (220) is assigned the same quantized value (230). (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 2) or non-uniformly spaced.

A scalar quantizer can be decomposed into two distinct stages. The first stage is the classifier stage, in which a classifier function mapping x→A[x] maps an input x to a quantization index A[x], which is often integer-valued. In essence, the classifier segments an input number line or data set. FIG. 3A shows a generalized classifier (300) and thresholds for a scalar quantizer. As in FIG. 2, a number line for a variable x is segmented by thresholds such as the threshold (310). Each value of x within a given range such as the range (320) is assigned the same quantization index.

In the second stage, a reconstructor functional mapping k→β[k] maps each quantization index k to a reconstruction value β[k]. In essence, the reconstructor selects a value for reconstruction of each region determined by the classifier. The reconstructor functional mapping may be implemented, for example, using a lookup table. FIG. 3B shows example classifier (350) thresholds for a scalar quantizer and also shows (as open circles) example reconstruction points according to a midpoint reconstruction rule. Overall, the classifier relates to the reconstructor as follows:

$$Q[x]=\beta[A[x]] \quad (1).$$

In common usage, the term "quantization" is often used to describe the classifier stage, which is performed during encoding. The term "inverse quantization" is similarly used to describe the reconstructor stage, whether performed during encoding or decoding.

B. Dead Zone+Uniform Threshold Quantizers.

A non-uniform quantizer has threshold values that are not uniformly spaced for all classifier regions. According to one possible definition, a dead zone plus uniform threshold quantizer ("DZ+UTQ") is a quantizer with uniformly spaced threshold values for all classifier regions except the one containing the zero input value (which is called the dead zone ("DZ")). In a general sense, a DZ+UTQ is a non-uniform quantizer, since the DZ size is different than the other classifier regions.

FIG. 4 shows a staircase I/O function (400) for a DZ+UTQ, and FIG. 5A shows a generalized classifier (500) and thresholds for a DZ+UTQ. In FIG. 5A, the DZ is twice as wide as the other classification zones. FIG. 5B shows example classifier (550) thresholds for a DZ+UTQ and also shows (as open circles) example reconstruction points according to a midpoint reconstruction rule.

C. Adjusting Quantization.

In many systems, the extent of quantization is parameterized in terms of quantization step size, which is adapted to regulate quality and/or bit rate. Coarser quantization uses larger quantization step sizes. Finer quantization uses smaller quantization step sizes. Often, for purposes of signaling and reconstruction, quantization step sizes are parameterized as multiples of a smallest quantization step size.

Some standards and products also allow specification of a quantization matrix, or scaling matrix, that indicates different weights for different frequency coefficients in quantization. Frequency coefficients are then quantized and inverse quantized using weighted quantization step sizes. For example, a scaling matrix for an intra-coded block uses higher weights for high frequency coefficients and lower weights for low frequency coefficients, which tends to shift distortion that is introduced to high frequency coefficients where it is less apt to cause perceptible quantization artifacts.

Some standards and products support selection between different reconstruction rules. For example, in some systems, a decoder can switch between a "uniform" quantizer reconstruction rule and a "non-uniform" quantizer reconstruction rule. Typically, for a given reconstruction rule, standards and products specify reconstruction values that correspond to midpoint reconstruction for the sake of simplicity. In FIGS. 3B and FIG. 5B, example reconstruction points according to midpoint reconstruction rules are superimposed as circles at the midpoints of the ranges that define quantization bins.

Standards and product specifications that focus only on achieving interoperability will often specify reconstruction values without specifying a classification rule. In other words, some specifications may define the functional mapping k→β[k] without defining the functional mapping x→A[x]. This allows a decoder built to comply with the standard/product to reconstruct information correctly. In contrast, encoders are often given the freedom to change the classifier. For classification, the thresholds can be defined so that certain input values will be mapped to more common (and hence, lower bit rate) indices, which makes the reconstruction values closer to optimal for some content. When an encoder defines quantization bin boundaries in a static way, this allows the encoder to adjust in a predetermined way to expected distributions in values. For example, an encoder may define the DZ threshold to be 1.2*QP for a quantizer (rather than 1*QP as might be expected given midpoint reconstruction). While changing how quantization thresholds are defined can improve performance, it does not support content-adaptive behavior during quantization.

The preceding adaptive quantization mechanisms help improve performance in many scenarios. In some configurations, however, they fail to provide fine-grained control over quantization that is sufficiently adaptive.

SUMMARY

In summary, the detailed description presents techniques and tools for improving quantization by adapting deadzone ("DZ") size. For example, a video encoder adjusts DZ size for blocks of frequency coefficients being encoded, which gives the encoder finer grained control over how distortion is introduced during quantization. By adjusting DZ size depending on the texture of a block, the encoder is able to introduce more distortion where it is less perceptible (such as in highly textured areas) and introduce less distortion in other areas (such as smooth areas).

In some embodiments, a tool such as a video encoder gets a texture measurement for image or video information. When multiple quantizers are available, the tool selects one of the quantizers to use in quantization. The tool adjusts DZ size of the quantizer based at least in part on the texture measurement, and the tool quantizes the information (e.g., frequency coefficients for a block of such information) using the quantizer with the adjusted DZ size. For example, the tool computes an adjustment factor using the texture measurement and adjusts an initial DZ size for the quantizer with the adjustment factor. The way the tool adjusts DZ size can depend on the quantizer used as well as whether the content is intra-coded or inter-coded.

In other embodiments, a tool such as a video encoder performs a frequency transform on values for image or video information, producing frequency coefficients. For at least one of the frequency coefficients (e.g., an AC coefficient), the tool adjusts DZ size of a quantizer based at least in part on frequency of the coefficient and quantizes the coefficient using the quantizer with the adjusted DZ size. For example, the tool adds a weighted DZ size offset to an initial DZ size for the quantizer. The frequency-dependent DZ resizing can be used in combination with texture-dependent DZ resizing.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 1 is a diagram illustrating encoding of a block with intra-picture compression according to the prior art.

FIGS. 2, 3A, 3B, 4, 5A and 5B are charts illustrating quantization according to the prior art.

FIG. 7 is a block diagram of a video encoder system in conjunction with which several described embodiments may be implemented.

FIGS. 14A through 14E are charts illustrating example scaling matrices with different DZ size weights for different coefficient frequencies.

DETAILED DESCRIPTION

Figure 6:
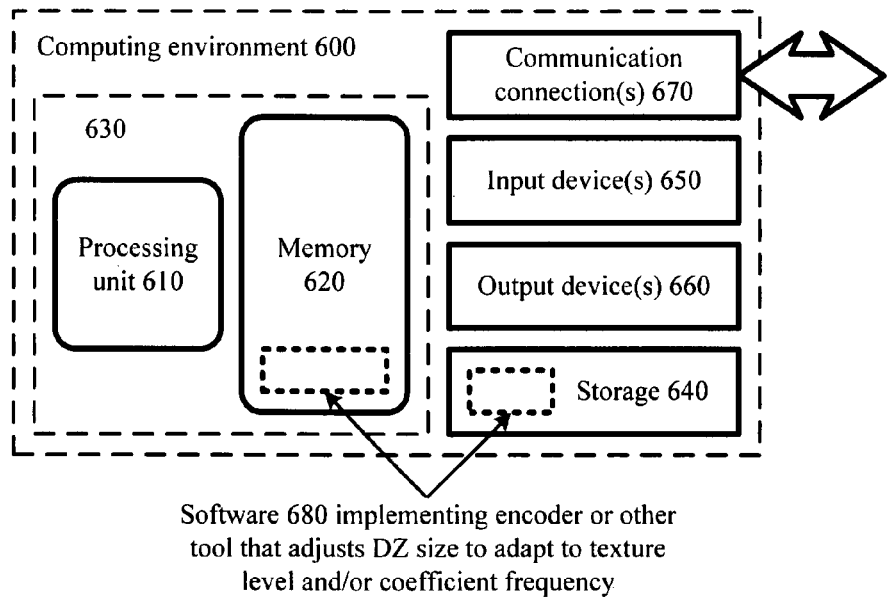
FIG. 6 is a block diagram of a suitable computing environment in which several described embodiments may be implemented.

The present application relates to techniques and tools for improving quantization by adapting deadzone ("DZ") size depending on texture level and/or frequency.

Quantization can produce visible artifacts that tend to be more artificial-looking and visually distracting than simple loss of fine detail. For example, smooth, untextured content is susceptible to contouring artifacts—artifacts that appear between regions of two different quantization output values—because the human visual system is sensitive to subtle variations (particularly luma differences) in smooth content. While the same amount of distortion may not create noticeable artifacts in textured areas due to masking effects of surrounding detail, in smooth regions it can create a visible line or step in the reconstructed image.

In some embodiments, when a video encoder quantizes the AC coefficients of a block, the video encoder adapts the DZ size of the quantizer depending on the texture level of the block and the frequency of the AC coefficient being quantized. When the block has little or no texture, the encoder decreases the DZ size. As the texture of the block becomes more dominant, the encoder increases the DZ size. The encoder also increases DZ size for higher frequency AC coefficients in the block, compared to lower frequency AC coefficients in the block. In this way, when the encoder introduces distortion to regulate bit rate, it tends to introduce more distortion where it is expected to be less perceptible (e.g., textured areas) and introduce less distortion where it would likely be more perceptible (e.g., smooth areas).

Various alternatives to the implementations described herein are possible. Certain techniques described with reference to flowchart diagrams can be altered by changing the ordering of stages shown in the flowcharts, by repeating or omitting certain stages, etc. For example, initial stages of texture analysis (e.g., obtaining texture information for a picture, macroblock(s) or block(s)) can be completed before later stages begin, or operations for the different stages can be interleaved on a block-by-block, macroblock-by-macroblock, or other region-by-region basis.

The various techniques and tools described herein can be used in combination or independently. Different embodiments implement one or more of the described techniques and tools. Aside from uses in video compression, the adaptive quantization techniques and tools can be used in image compression, other compression, or other areas. For example, while many examples described herein involve quantization of AC coefficients for blocks by a video encoder, alternatively the techniques and tools described herein are applied to quantization of AC coefficients for blocks in an image encoder.

Some of the techniques and tools described herein address one or more of the problems noted in the background. Typically, a given technique/tool does not solve all such problems. Rather, in view of constraints and tradeoffs in encoding time, resources, and/or quality, the given technique/tool improves encoding performance for a particular implementation or scenario.

I. Computing Environment.

FIG. 6 illustrates a generalized example of a suitable computing environment (600) in which several of the described embodiments may be implemented. The computing environment (600) is not intended to suggest any limitation as to scope of use or functionality, as the techniques and tools may be implemented in diverse general-purpose or special-purpose computing environments.

With reference to FIG. 6, the computing environment (600) includes at least one processing unit (610) and memory (620). In FIG. 6, this most basic configuration (630) is included within a dashed line. The processing unit (610) executes computer-executable instructions and may be a real or a virtual processor. In a multi-processing system, multiple processing units execute computer-executable instructions to increase processing power. The memory (620) may be volatile memory (e.g., registers, cache, RAM), non-volatile memory (e.g., ROM, EEPROM, flash memory, etc.), or some combination of the two. The memory (620) stores software (680) implementing an encoder with one or more of the described techniques and tools for texture-adaptive and/or frequency-adaptive adjustment of DZ size during quantization.

A computing environment may have additional features. For example, the computing environment (600) includes storage (640), one or more input devices (650), one or more output devices (660), and one or more communication connections (670). An interconnection mechanism (not shown) such as a bus, controller, or network interconnects the components of the computing environment (600). Typically, operating system software (not shown) provides an operating environment for other software executing in the computing environment (600), and coordinates activities of the components of the computing environment (600).

The storage (640) may be removable or non-removable, and includes magnetic disks, magnetic tapes or cassettes, CD-ROMs, DVDs, or any other medium which can be used to store information and which can be accessed within the computing environment (600). The storage (640) stores instructions for the software (680) implementing the video encoder.

The input device(s) (650) may be a touch input device such as a keyboard, mouse, pen, or trackball, a voice input device, a scanning device, or another device that provides input to the computing environment (600). For audio or video encoding, the input device(s) (650) may be a sound card, video card, TV tuner card, or similar device that accepts audio or video input in analog or digital form, or a CD-ROM or CD-RW that reads audio or video samples into the computing environment (600). The output device(s) (660) may be a display, printer, speaker, CD-writer, or another device that provides output from the computing environment (600).

The communication connection(s) (670) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (600), computer-readable media include memory (620), storage (640), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "measure" and "adjust" to describe computer operations in a computing environment. These terms are high-level abstractions for operations performed by a computer, and should not be confused with acts performed by a human being. The actual computer operations corresponding to these terms vary depending on implementation.

II. Generalized Video Encoder.

FIG. 7 is a block diagram of a generalized video encoder (700) in conjunction with which some described embodiments may be implemented. The encoder (700) receives a sequence of video pictures including a current picture (705) and produces compressed video information (795) as output to storage, a buffer, or a communications connection. The format of the output bitstream can be a Windows Media Video or VC-1 format, MPEG-x format (e.g., MPEG-1, MPEG-2, or MPEG-4), H.26x format (e.g., H.261, H.262, H.263, or H.264), or other format.

The encoder (700) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder (700) is block-based and uses a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. The encoder (700) can perform operations on sets of samples of different size or configuration than 8×8 blocks and 16×16 macroblocks. Alternatively, the encoder (700) is object-based or uses a different macroblock or block format.

Returning to FIG. 7, the encoder system (700) compresses predicted pictures and intra-coded, key pictures. For the sake of presentation, FIG. 7 shows a path for key pictures through the encoder system (700) and a path for predicted pictures. Many of the components of the encoder system (700) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction from one or more other pictures (which are typically referred to as reference pictures or anchors). A prediction residual is the difference between predicted information and corresponding original information. In contrast, a key picture (e.g., progressive I-frame, interlaced I-field, or interlaced I-frame) is compressed without reference to other pictures.

If the current picture (705) is a predicted picture, a motion estimator (710) estimates motion of macroblocks or other sets of samples of the current picture (705) with respect to one or more reference pictures. The picture store (720) buffers a reconstructed previous picture (725) for use as a reference picture. When multiple reference pictures are used, the multiple reference pictures can be from different temporal directions or the same temporal direction. The motion estimator (710) outputs as side information motion information (715) such as differential motion vector information.

The motion compensator (730) applies reconstructed motion vectors to the reconstructed (reference) picture(s) (725) when forming a motion-compensated current picture (735). The difference (if any) between a block of the motion-compensated current picture (735) and corresponding block of the original current picture (705) is the prediction residual (745) for the block. During later reconstruction of the current picture, reconstructed prediction residuals are added to the motion compensated current picture (735) to obtain a reconstructed picture that is closer to the original current picture (705). In lossy compression, however, some information is still lost from the original current picture (705). Alternatively, a motion estimator and motion compensator apply another type of motion estimation/compensation.

A frequency transformer (760) converts spatial domain video information into frequency domain (i.e., spectral, transform) data. For block-based video pictures, the frequency transformer (760) applies a DCT, variant of DCT, or other forward block transform to blocks of the samples or prediction residual data, producing blocks of frequency transform coefficients. Alternatively, the frequency transformer (760) applies another conventional frequency transform such as a Fourier transform or uses wavelet or sub-band analysis. The frequency transformer (760) may apply an 8×8, 8×4, 4×8, 4×4 or other size frequency transform.

A quantizer (770) then quantizes the blocks of transform coefficients. The quantizer (770) applies non-uniform, scalar quantization to the spectral data with a step size that varies on a picture-by-picture basis or other basis. The quantizer (770) can also apply another type of quantization to the spectral data coefficients, for example, a uniform or adaptive quantization for at least some of the coefficients, or directly quantizes spatial domain data in an encoder system that does not use frequency transformations. In described embodiments, the quantizer (770) adapts quantization of AC coefficients by changing DZ size depending on texture and/or frequency.

When a reconstructed current picture is needed for subsequent motion estimation/ compensation, an inverse quantizer (776) performs inverse quantization on the quantized spectral data coefficients. An inverse frequency transformer (766) performs an inverse frequency transform, producing blocks of reconstructed prediction residuals (for a predicted picture) or samples (for a key picture). If the current picture (705) was a key picture, the reconstructed key picture is taken as the reconstructed current picture (not shown). If the current picture (705) was a predicted picture, the reconstructed prediction residuals are added to the motion-compensated predictors (735) to form the reconstructed current picture. One or both of the picture stores (720, 722) buffers the reconstructed current picture for use in subsequent motion-compensated prediction.

The entropy coder (780) compresses the output of the quantizer (770) as well as certain side information (e.g., motion information (715), quantization step size). Typical entropy coding techniques include arithmetic coding, differential coding, Huffman coding, run length coding, LZ coding, dictionary coding, and combinations of the above. The entropy coder (780) typically uses different coding techniques for different kinds of information, and can choose from among multiple code tables within a particular coding technique.

The entropy coder (780) provides compressed video information (795) to the multiplexer ("MUX") (790). The MUX (790) may include a buffer, and a buffer level indicator may be fed back to a controller. Before or after the MUX (790), the compressed video information (795) can be channel coded for transmission over the network.

A controller (not shown) receives inputs from various modules such as the motion estimator (710), frequency transformer (760), quantizer (770), inverse quantizer (776), entropy coder (780), and buffer (790). The controller evaluates intermediate results during encoding, for example, setting quantization step sizes and performing rate-distortion analysis. The controller works with modules such as the motion estimator (710), frequency transformer (760), quantizer (770), and entropy coder (780) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The relationships shown between modules within the encoder (700) indicate general flows of information in the encoder; other relationships are not shown for the sake of simplicity. In particular, FIG. 7 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder (700). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Adaptive Adjustment of DZ Size for Quantization.

This section describes techniques and tools for adaptively adjusting the DZ size of a quantizer depending on texture and/or frequency. For example, a video encoder measures texture for a block of samples or residual values, then adjusts the size of the DZ (the center quantization bin where values are quantized to a level of zero) using the measured texture. The encoder can further adjust DZ size to account for differences in perceptual importance of different frequencies of coefficients. This helps the video encoder improve the perceptual quality of the encoded video.

Perceptual sensitivity to quantization artifacts is related to texture level in both the spatial and temporal domain. High texture levels often result in masking effects that can hide quality degradation and quantization artifacts. On the other hand, in regions with lower texture levels (e.g., smooth regions), degradation and quantization artifacts are more visible. Previous encoders have made quantization adjustments for some parts of video pictures (e.g., picture edges). Another approach adjusts quantization step size (e.g., QP) in reaction to changes in texture. Adapting DZ size, by itself or in combination with other adaptive quantization techniques, provides another mechanism to regulate rate-distortion performance.

A. Explanation.

Quantization typically reduces the number of bits required to code information such as transform coefficients, but also introduces distortion. In general, the human visual system is sensitive to distortion in low-detail regions of an image, compared to regions with more texture. A goal of the adaptive DZ resizing techniques and tools described herein is to introduce distortion where it is less perceptible when distortion is introduced during encoding.

1. Example Reconstruction Rules for AC Coefficients.

In some embodiments, the decoder (or encoder during encoder-side reconstruction) uses either of two different quantizer rules when reconstructing AC coefficients for an N×M block. The reconstruction rules are also called inverse quantization modes. The decoder or encoder uses a "uniform" quantizer reconstruction rule or a "non-uniform" quantizer reconstruction rule.

In some implementations, the inverse quantization mode is specified for a picture. All blocks in the picture use the same inverse quantization mode. The value of the parameter QP controls the amount of quantization that is applied to the coefficients, and QP can vary within a picture for some encoding settings. The value of QP can take any integer value between 1 and 31 inclusive. The value is multiplied by a factor of 2 before being used in inverse quantization. (The quantization factor can also be modified by a "halfQP" step, but for the sake of simplicity this halfQP step quantization is not addressed in the following discussion.)

According to the "uniform" quantizer reconstruction rule, the decoder or encoder reconstructs AC coefficients as follows:

$$C = 2 \times QP \times L \qquad (2),$$

where C is the reconstructed, inverse quantized AC coefficient, and L is the quantized level for the coefficient. Reconstruction points appear as circles at the locations shown in FIG. 8A. Notional quantization bin boundaries appear as dashed lines in FIG. 8A, but in practice, the quantization bin boundaries used during quantization need not have been at the positions shown in FIG. 8A, and need not have been "uniform" at all.

According to the "non-uniform" quantizer reconstruction rule, the decoder or encoder reconstructs non-zero AC coefficients as follows:

$$C = (2 \times L + 1) \times QP \qquad (3).$$

Zero value levels are reconstructed as zero-value AC coefficients. The quantization bin that includes the zero-value reconstruction point (the DZ) is wider than the others. Reconstruction points (and notional quantization bin boundaries) appear at the locations shown in FIG. 8B. In practice, the quantization bin boundaries used during quantization need not have been at the positions shown in FIG. 8B.

Alternatively, the decoder/encoder uses more or fewer rules and/or different rules during reconstruction. Moreover, the parameterization and signaling used for quantization parameters can vary from implementation to implementation.

2. Simple Corresponding Quantization Rules.

The quantization rules used to convert the AC coefficients to quantized levels L are not specified or implied by the reconstruction rules (2) and (3). Rather, quantization rules, including placement of the quantization bin boundaries, are defined by the encoder.

Figure 8A:
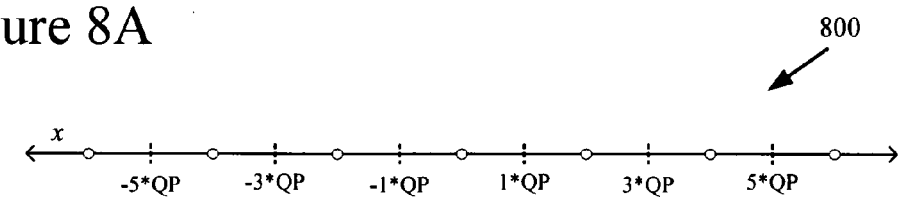
FIGS. 8A and 8B are charts illustrating example quantization rules.

Suppose the distribution of AC coefficient values was uniform. For the "uniform" quantizer reconstruction rule, the corresponding quantization rule that would produce minimum distortion would be:

$$L = \operatorname{sign}(C) \times ((\operatorname{abs}(C) + QP) / / (2 \times QP)) \qquad (4),$$

where sign(C)=−1 for C<0, and sign(C)=1 for C>=0. The // operation indicates integer division with rounding towards zero, and abs(C) indicates the absolute value of C. For this quantization rule, the notional quantization bin boundaries shown in FIG. 8A are the actual quantization bin boundaries for decisions during quantization.

For the "non-uniform" quantizer reconstruction rule, the corresponding quantization rule that would produce minimum distortion would be:

$$L = \operatorname{sign}(C) \times (\operatorname{abs}(C) / / (2 \times QP)) \qquad (5).$$

Figure 8B:
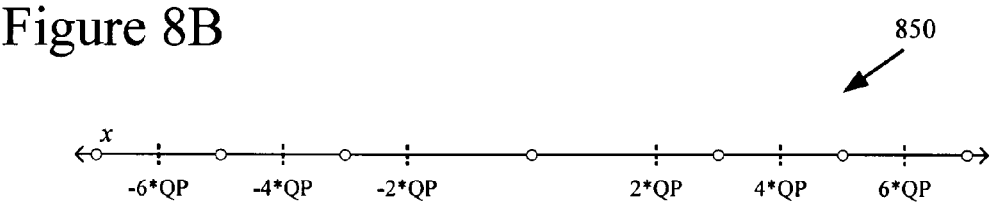

For this quantization rule, the notional quantization bin boundaries shown in FIG. 8B are the actual quantization bin boundaries for decisions during quantization.

For many typical encoding scenarios, however, the quantization rules shown in (4) and (5) do not provide optimal rate-distortion performance. The distribution of values within quantization bins is typically not normal. Moreover, the quantization rules do not account for differences in the perceptibility of distortion in different situations.

Quantization of AC coefficients introduces distortion, which can be measured in objective terms as the difference between original sample values and reconstructed sample values. Such measures do not account for human perception, however. One aspect of the human visual system is that the same amount of distortion may be perceived differently depending on factors such as visual texture. For example, if distortion in a smooth region introduces relatively perceptible artifacts, that same amount of may be is much less noticeable in a highly textured region. For this reason, encoders may adaptively quantize a picture based on the local texture so that relatively fewer bits are expended (and hence more distortion is introduced) in high texture regions and relatively more bits are expended (hence less distortion is introduced) in low texture regions.

In some codec systems, the encoder varies a quantization step size parameter (such as QP) depending on texture. This allows the encoder to increase QP when doing so will not dramatically increase perceptibility of the distortion and decrease QP in other situations. While this improves rate-distortion performance in many circumstances, finer grained control over quantization performance is desired.

B. Texture-Adaptive Adjustment of DZ Size.

In some embodiments, an encoder uses texture-adaptive adjustment of DZ size. The texture-adaptive adjustment can be used with frequency-adaptive adjustment of DZ size (see section C) or by itself.

1. Generalized Technique for Texture-adaptive DZ Resizing.

Figure 9:
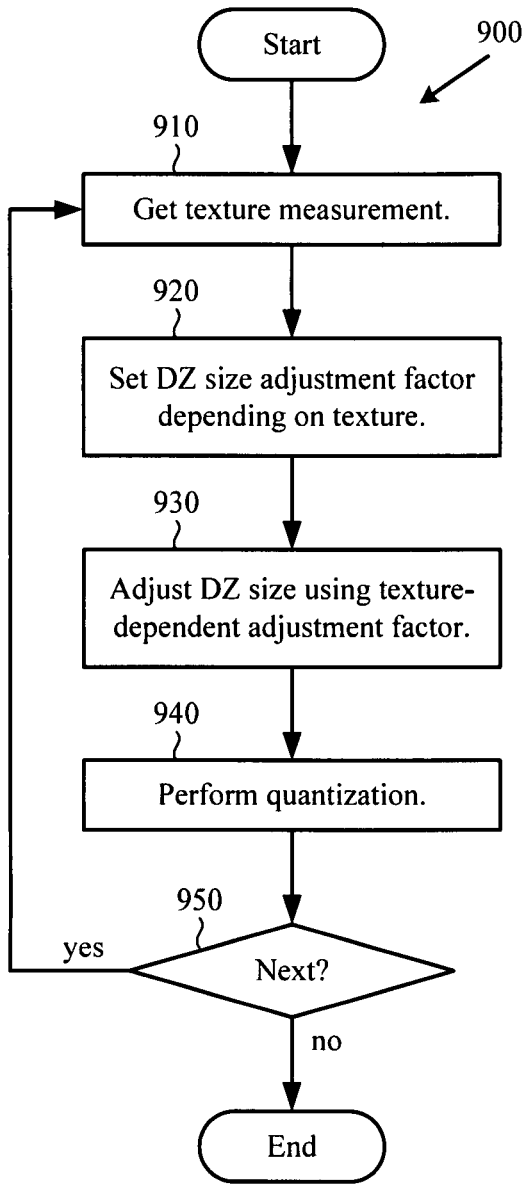
FIG. 9 is a flowchart illustrating a generalized technique for texture-adaptive adjustment of DZ size for quantization.

FIG. 9 shows a generalized technique (900) for adjusting DZ size depending on texture. An encoder such as the encoder (700) shown in FIG. 7 or other encoder performs the technique (900). For higher levels of texture, the encoder incrementally expands DZ size so that more input values are quantized to the zero level and more input values are shifted to a lower quantization level. While such adjustments may seem somewhat contrary to goals of rate-distortion optimization, in practice they provide improved perceptual quality in many encoding scenarios.

FIG. 9 shows an iterative process of getting a texture measurement and adapting DZ size for quantization. The encoder repeats the process on a block-by-block basis, macroblock-by-macroblock basis or other basis. Also, for the sake of simplicity, FIG. 9 does not show how the technique (900) interacts with other encoding processes such as frequency transformation, entropy encoding and rate control.

With reference to FIG. 9, the encoder gets (910) a texture measurement. For example, the encoder computes a texture measurement for a sub-block, block, macroblock, slice or other unit of sample or residual values. The texture measurement is a sum of differences between values of the unit and their average value. Alternatively, the texture measurement uses another texture metric. The encoder can compute the texture measurement "in-line" with the DZ size adaptation process, or it can compute the texture measurement beforehand and get the measurement from storage or memory.

The encoder sets (920) a DZ size adjustment factor depending on the texture and adjusts (930) the DZ size using the texture-dependent adjustment factor. For example, the encoder uses a texture measurement to determine a DZ size offset using an approach explained in the next section, then adds the offset to an initial DZ size. The initial DZ size can be a pre-defined size proportion implemented as part of a given quantization rule. Alternatively, the encoder sets the DZ size adjustment factor in some other way and/or uses a DZ scale factor rather than an offset.

The encoder performs (940) quantization using the quantizer with the adjusted DZ size and checks (950) whether to continue with the next unit of content. If so, the encoder continues by getting (910) a texture measurement for the next unit to be quantized.

2. Example Texture-adaptive Adjustments to DZ Size.

In some implementations, an encoder performs texture-adaptive adjustment of DZ size as follows. The encoder computes a DZ size offset d for a block that depends on a texture measurement for the block. The encoder then adjusts DZ size and performs quantization of the AC coefficients for the block. The exact quantization rules depend on the type of content (intra or inter) as well as the quantizer reconstruction rule that the decoder will use (uniform or non-uniform).

For an inter-coded block (e.g., for a prediction residual) and uniform quantizer reconstruction rule, the encoder applies the following quantization rule:

$$L=\text{sign}(C)\times((\text{abs}(2\times C)+QP-d)//(4\times QP)) \quad (6).$$

For an inter-coded block and non-uniform quantizer reconstruction rule, the encoder applies the following quantization rule:

$$L=\text{sign}(C)\times((\text{abs}(2\times C)-QP-d)//(4\times QP)) \quad (7).$$

The initial or default DZ size is built into the quantization rules (6) and (7). For example, for rule (6), the "+QP//(4×QP)" term reflects the initial DZ size. For rule (7), the "−QP//(4×QP)" term reflects the initial DZ size.

Figure 10:
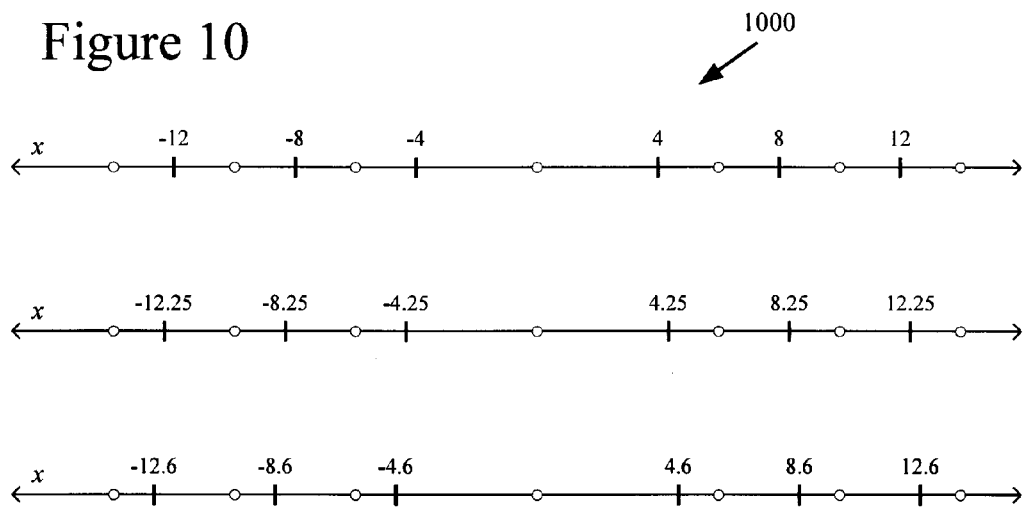
FIGS. 10 and 11 are charts illustrating quantization bins for different example DZ sizes.

FIG. 10 shows charts (1000) for numerical examples illustrating the quantization rule of equation (7) for example values of QP and d. Each of the charts shows midpoint reconstruction points as open circles, according to the non-uniform quantizer reconstruction rule of equation (3) when QP=2. For the sake of comparison, the top chart shows quantization bin boundaries for the quantization rule of equation (5) when QP=2. The DZ size is 8, and quantization bin boundaries are evenly spaced at intervals of 4 after the DZ. The middle chart shows quantization bin boundaries according to the quantization rule of equation (7) when QP=2 and d=0. For this no-texture block, the DZ size is 8.5 and the quantization bin boundaries are evenly spaced at intervals of 4 after the DZ. The bottom chart of FIG. 10 shows quantization bin boundaries according to the quantization rule of equation (7) when QP=2 and d=10240. For this textured block, the DZ size is 9.2. Again, the quantization bin boundaries are evenly spaced at intervals of 4 after the DZ.

In general, increasing DZ size makes more input values get quantized to the zero level. Another effect is that more input values are quantized towards a lower reconstruction point (as opposed to being quantized towards the closest reconstruction point). While distortion increases as these effects increase, the distortion is expected to be masked in the increased texture detail.

The adjustment factor d in equations (6) and (7) is a function of the block texture t as follows:

$$d = 0, \quad \text{for } t \leq 1024 \quad (8)$$

$$d = 2 \times QP \times \frac{(t-1024)}{(t+3072)}, \quad \text{for } t > 1024.$$

Figure 12A:
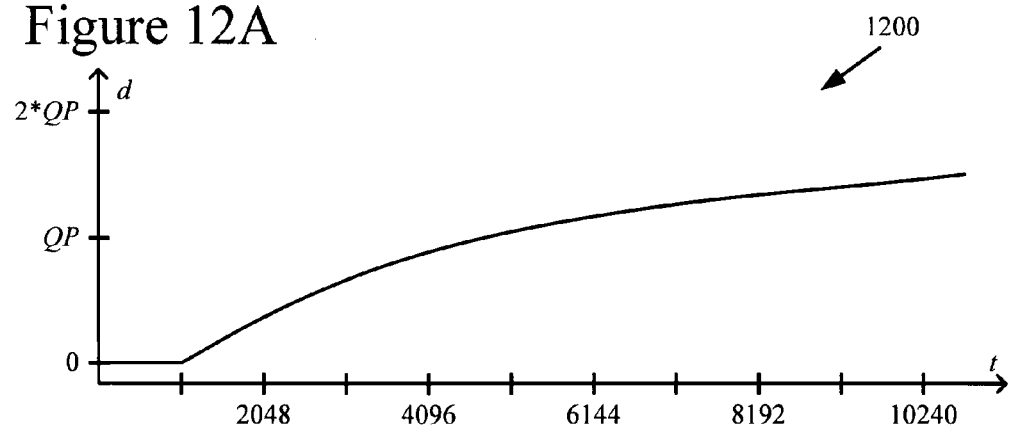
FIGS. 12A through 12C are charts illustrating example DZ size offsets that vary as a function of texture level.

So, for an inter-coded block, d is zero until t exceeds 1024. At that point, d increases, approaching 2QP, as t increases. FIG. 12A charts d as a function (1200) of t according to equation (8) for some values of t. In this implementation, t is a texture measure computed as the sum of absolute differences between values in an 8×8 block and the average of values in the 8×8 block (see equation (13) below).

For an intra-coded block and uniform quantizer reconstruction rule, the encoder applies the following quantization rule and function mapping t to d:

$$L=\text{sign}(C)\times((\text{abs}(C)+QP-d)//(2\times QP)) \quad (9),$$

where:

$$d = \left(\left(\frac{2\times QP}{10}\right)\times t\right) >> 10, \quad \text{for } t \leq 1024 \quad (10)$$

$$d = \frac{2\times QP}{10}, \quad \text{for } 1024 > t < 4096$$

$$d = \left(\frac{2\times QP}{10}\right)\times\left(1+4\times\left(\frac{t-4096}{t-2048}\right)\right), \quad \text{for } t \geq 4096.$$

Figure 12B:
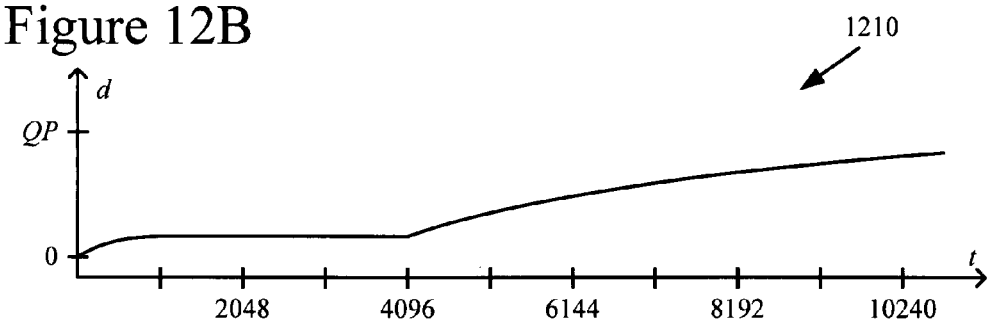

So, for an intra-coded block and uniform quantizer reconstruction rule, d increases until t is 1024. From that point until t is 4096, d stays the same. Then d increases, approaching QP, as t increases. FIG. 12B charts d as a function (1210) of t according to equation (10) for some values of t.

For an intra-coded block and non-uniform quantizer reconstruction rule, the encoder applies the following quantization rule and function mapping t to d:

$$L=\text{sign}(C)\times((\text{abs}(C)-d)//(2\times QP)) \quad (11),$$

where:

$$d = 0, \quad \text{for } t < 4096 \quad (12)$$

$$d = QP \times \left(\frac{t-4096}{t-2048}\right), \quad \text{for } t \geq 4096.$$

Figure 12C:
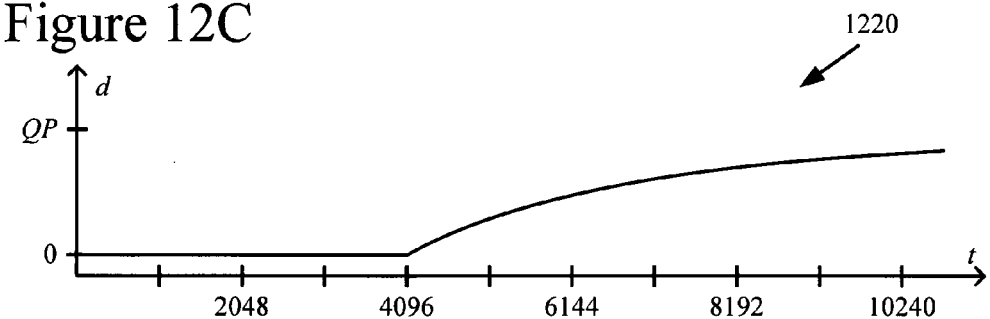

So, for an intra-coded block and non-uniform quantizer reconstruction rule, d is zero until t is 4096 Then d increases, approaching QP, as t increases. FIG. 12C charts d as a function (1220) of t according to equation (12) for some values of t.

Figure 11:
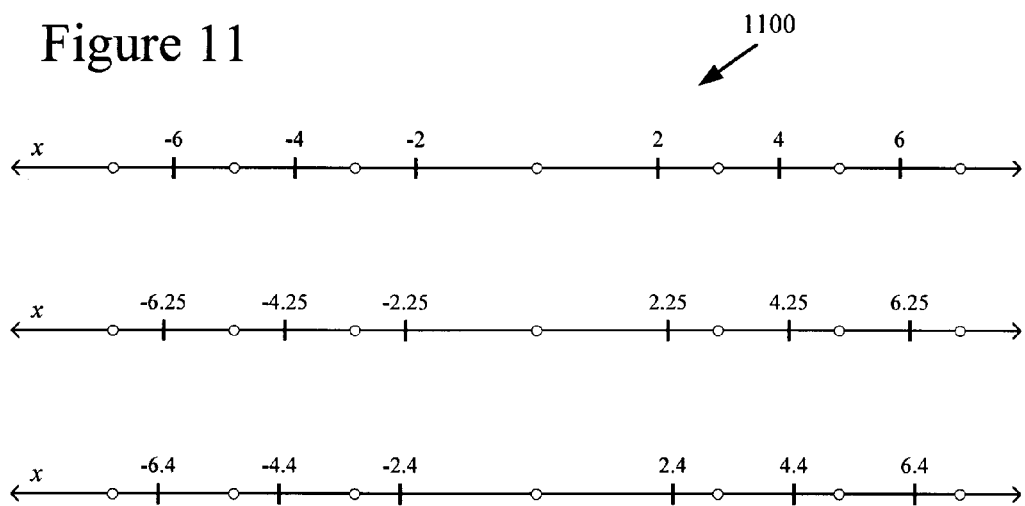

FIG. 11 shows charts (1100) for numerical examples illustrating the quantization rule of equation (11) for example values of QP and d. Each of the charts shows midpoint reconstruction points as open circles, according to the non-uniform quantizer reconstruction rule of equation (3) when QP=1. For the sake of comparison, the top chart shows quantization bin boundaries for the quantization rule of equation (5) when QP=1. The DZ size is 4, and quantization bin boundaries are evenly spaced at intervals of 2 after the DZ. The middle chart shows quantization bin boundaries according to the quantization rule of equation (11) when QP=2 and d=6144. For this medium texture block, the DZ size is 4.5 and the quantization bin boundaries are evenly spaced at intervals of 2 after the DZ. The bottom chart of FIG. 11 shows quantization bin boundaries according to the quantization rule of equation (11) when QP=1 and d=10240. For this textured block, the DZ size is 4.8. Again, the quantization bin boundaries are evenly spaced at intervals of 2 after the DZ.

The quantization rules for intra-coded content provide less aggressive expansion of DZ size, compared to the rules for inter-coded content. In many encoding scenarios, allocating relatively more bits to intra-coded pictures can also improve the quality of inter-coded content that uses motion-compensated prediction from the intra-coded pictures. Another reason to more aggressively quantize inter-coded content is that distortion introduced in inter-coded content is less apt to be perpetuated to other content.

Alternatively, an encoder uses other and/or additional quantization rules. For example, the encoder uses a quantization rule that more aggressively increases DZ size as texture increases. Or, the encoder uses a quantization rule that less aggressively increases DZ size as texture increases. Moreover, although the encoder can use different rules for inter-coded content and intra-coded content, alternatively the encoder uses the same rule(s) for inter-coded content and intra-coded content.

The preceding functions mapping t to d are configured for an 8×8 block. For a different size block, the thresholds between different formulas for determining d vary accordingly. Alternatively, an encoder uses different functions or an entirely different texture metric.

3. Example Texture Metrics.

The texture of a block or other unit of image or video information generally corresponds to amount of detail in the block/unit. It can also relate to the amount of energy in different frequency coefficients for the block/unit. A relatively smooth block has little or no texture, and most of the energy for the block is in the lower frequency coefficients. A block with complex, intricate detail has high texture, and the higher frequency AC coefficients may represent much of the energy for the block.

For texture-adaptive adjustment of DZ size, an encoder measures texture for a block or other unit of image or video information according to a perceptual model. The encoder can compute the measure by processing each of the values for the block or other unit, or the encoder can sub-sample the available values to compute the measure, or the encoder can estimate the texture measure even more heuristically. The encoder can generate a texture map for a current picture, indicating the texture levels of the different parts of the picture. For example, the texture map can be used to store texture measurements or to otherwise identify smooth regions and textured regions in the picture. Alternatively, an encoder uses texture information without first creating a texture map.

In some implementations, the texture measure for an N×M block of samples or residual values is computed as follows:

$$t = \sum_{i<N}^{i=0} \sum_{j<M}^{j=0} \mathrm{abs}(x_{i,j} - \bar{x}), \tag{13}$$

where $x_{i,j}$ is the value of the sample at position i,j in the block, and $\bar{x}$ is the average of all the samples in the N×M block.

In other implementations, texture is measured using an intensity variance metric. For example, the encoder computes intensity variance within a block of samples as the sum of differences between a sample and its adjacent samples (e.g., above, left, right, below or diagonal) for each of some or all of the samples in the block. The intensity value of a given sample in the block is compared to the samples for four locations near it, and the encoder computes an average sum of the difference between the given sample and the samples for its surrounding locations. As an indicator of intensity variance, these intensity difference measures can be used directly as a texture metric in DZ resizing, or the encoder can compute the average intensity difference for use as a texture metric in DZ resizing. Alternatively, the encoder evaluates a histogram of the intensity difference measures and identifies the prevalent texture for the block, or computes the mean intensity difference or median intensity difference as indicative of the texture level for the block.

The texture measurement t for a block can be computed using all of the sample values in the block or a sub-sampling of the values in the block. In other implementations, texture is measured using other texture metrics and/or for different units of information. In general, the texture metric addresses texture (a) within a unit such as a block; (b) in other areas of a picture or part of a picture to exploit spatial masking effects; and/or (c) from picture-to-picture to exploit temporal masking effects.

C. Frequency-adaptive Adjustment of DZ Size.

Instead of using the same DZ size for all AC coefficients of a block or other unit of content, an encoder can change DZ size depending on frequency. For example, the encoder uses a wider DZ for higher frequency coefficients, since those higher frequency coefficients usually represent activity in the sample domain in which encoding artifacts are less noticeable. This observation is especially valid for intra-coded content.

Therefore, in some embodiments, an encoder uses frequency-adaptive adjustment of DZ size. The frequency-adaptive adjustment can be used with texture-adaptive adjustment of DZ size (see section B) or by itself.

1. Generalized Technique for Frequency-adaptive DZ Resizing.

Figure 13:
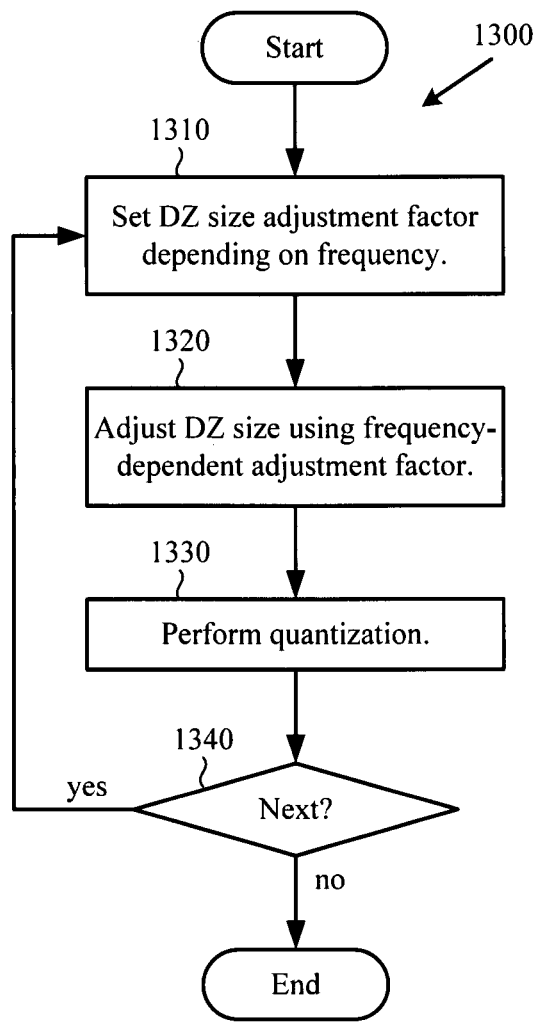
FIG. 13 is a flowchart illustrating a generalized technique for frequency-adaptive adjustment of DZ size for quantization.

FIG. 13 shows a generalized technique (1300) for adjusting DZ size depending on frequency. An encoder such as the encoder (700) shown in FIG. 7 or other encoder performs the technique (1300).

FIG. 13 shows an iterative process of adapting DZ size depending on frequency. The encoder can adjust DZ size from coefficient to coefficient or at threshold positions in a zigzag scan of the coefficients. The encoder repeats the process for different coefficients or sets of coefficients. Also, for the sake of simplicity, FIG. 13 does not show how the technique (1300) interacts with other encoding processes such as frequency transformation, entropy encoding and rate control.

With reference to FIG. 13, the encoder sets (1310) a DZ size adjustment factor depending on frequency and adjusts (1320) DZ size using the frequency-dependent adjustment factor. For example, the encoder determines a scaling factor or weight associated with the frequency of a particular coefficient being quantized then applies it to adjust an initial DZ size. FIGS. 14A to 14E show example weights for different sizes of transform blocks in some implementations. The initial DZ size can be built into a quantization rule as a pre-defined proportion. Alternatively, the encoder uses another approach to parameterize the frequency-dependent adjustment factor and adjust the DZ size.

The encoder performs (1340) quantization for one or more coefficients using the quantizer with the adjusted DZ size and checks (1350) whether to continue with the next coefficient(s) having a different frequency-dependent adjustment factor. If so, the encoder continues by setting (1310) the frequency-dependent adjustment factor for the next coefficient(s).

2. Example Frequency-adaptive Adjustments to DZ Size.

In some implementations, an encoder performs frequency-adaptive adjustment of DZ size as follows. The encoder looks up a frequency-dependent weight for a coefficient in an array of weights $A_{m \times n}$ such as shown in FIGS. 14A to 14E. The encoder scales a DZ size offset factor by the frequency-dependent weight and adjusts an initial DZ size, which may be implemented as part of a quantization rule. The encoder then quantizes one or more AC coefficients using the adjusted quantization rule. The exact quantization rules depend on the type of content (intra or inter) as well as the quantizer reconstruction rule that the decoder will use (uniform or non-uniform).

For example, the encoder adjusts DZ size for the coefficient at position m, n as follows:

$$DZ_{m,n} = DZ_{default} + A_{m \times n}(m,n) \times \Delta DZ \qquad (15),$$

where $DZ_{default}$ indicates the default DZ size and $\Delta DZ$ indicates a delta DZ size offset. If the frequency-dependent adaptation of DZ size is used together with texture-dependent adaptation of DZ size, $\Delta DZ$ reflects a texture-dependent offset. In practice, the DZ size adjustment can be implemented as part of the quantization rule itself, as in the previous section. Alternatively, the encoder implements frequency-adaptive adjustment of DZ size using a different rule for computing the adjustment and/or performing quantization.

Figures 14A, 14B, 14C, 14D, 14E:
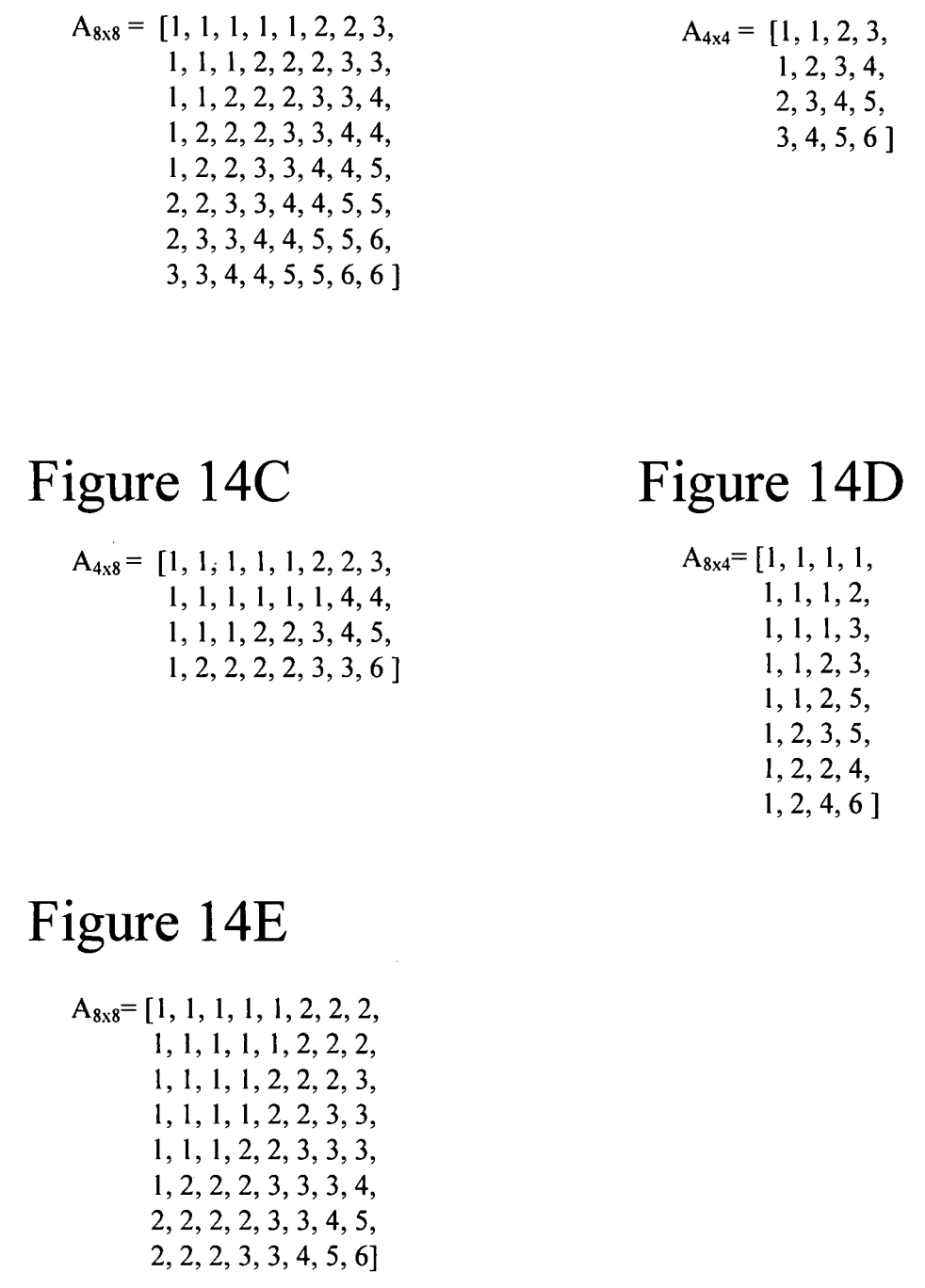

The numbers, sizes and weights of scaling matrices depend on implementation. FIG. 14A shows an example array $A_{8 \times 8}$ for an 8×8 transform block. The weight for coefficient depends on the horizontal frequency n and vertical frequency m of the coefficient in question. FIGS. 14B to 14D show arrays for different sizes of transform blocks—4×4, 4×8 and 8×4, respectively.

Different scaling matrices can also be used to apply different strengths of frequency-dependent DZ resizing. FIG. 14E shows a second array for an 8×8 transform block. Compared to the array of FIG. 14A, the array of FIG. 14E scales DZ size in a less aggressive manner, leading to smaller DZs for high-frequency coefficients. The encoder can switch between scaling matrices of an appropriate size depending on texture, bit rate, and/or other criteria.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of encoding image or video information, the method comprising:
    using a computer, dividing the image or a picture associated with the video information into multiple blocks;
    getting a texture measurement for the image or video information;
    adjusting deadzone size of a quantizer, on a block basis, based at least in part on the texture measurement, so that the deadzone size expands as an amount of texture increases, wherein the texture is related to a smoothness of a block;
    quantizing the image or video information using the quantizer with the adjusted deadzone size to transform the image or video information to a quantized version thereof; and
    performing a frequency transform that produces a DC coefficient and plural AC coefficients, wherein the plural AC coefficients are the information that is quantized and for at least one of the plural AC coefficients, the adjusted deadzone size of the quantizer is also based at least in part on the AC coefficient.

2. The method of claim 1 wherein the getting the texture measurement comprises computing a sum of absolute differences of values for the information and an average value for the information.

3. The method of claim 1 wherein the adjusting depends on the quantizer and whether the information is for intra-coded content or inter-coded content.

4. The method of claim 1 further comprising, before the adjusting, selecting the quantizer from among plural available quantizers having different initial deadzone sizes.

5. The method of claim 1 wherein the adjusting comprises:
    computing an adjustment factor using the texture measurement; and
    adjusting an initial deadzone size for the quantizer with the adjustment factor.

6. The method of claim 5 wherein the adjustment factor comprises a deadzone size offset computed with a function that maps texture to deadzone size.

7. The method of claim 1 further comprising entropy encoding results of the quantizing and outputting results of the entropy encoding in an encoded video bit stream.

8. The method of claim 1 wherein the information is for a sub-block, block, macroblock, slice or picture for intra-coded or inter-coded content.

9. A method of encoding image or video information, the method comprising:
    using a computer, performing a frequency transform on plural values for image or video information, producing a DC coefficient and plural frequency coefficients including plural AC coefficients; and
    for at least one of the plural frequency coefficients:
        adjusting deadzone size of a quantizer based at least in part on frequency of the AC coefficient, so that the deadzone size becomes wider for higher frequency coefficients; and quantizing the coefficient using the quantizer with the adjusted deadzone size.

10. The method of claim 9 further comprising, before the adjusting, selecting the quantizer from among plural available quantizers having different initial deadzone sizes.

11. The method of claim 9 wherein the adjusted deadzone size is further based at least in part on a texture measurement.

12. The method of claim 9 wherein the adjusting comprises adding a weighted deadzone size offset to an initial deadzone size for the quantizer.

13. The method of 12 further comprising computing the weighted deadzone size offset by multiplying a texture-dependent offset by a frequency-dependent weight.

14. The method of claim 9 wherein the adjusting comprises:
    determining a frequency-dependent weight for the coefficient using a scaling matrix; and
    modifying an initial deadzone size for the quantizer using the frequency-dependent weight.

15. The method of claim 9 further comprising entropy encoding results of the quantizing and outputting results of the entropy encoding in an encoded video bit stream.

16. The method of claim 9 wherein the information is for a sub-block, block, macroblock, slice or picture for intra-coded or inter-coded content.

17. An encoder comprising:
    a frequency transformer for converting values, in a computer, for image or video information into plural frequency coefficients that include a DC coefficient and plural AC coefficients;
    a module for measuring texture for the image or video information;
    a quantizer for quantizing the plural frequency coefficients, including, for the plural AC coefficients, adjusting deadzone size of a quantizer on a block-by-block basis based at least in part on the measured texture and frequencies of the plural AC coefficients, so that the deadzone size expands with an increasing amount of measured texture and the deadzone size becomes wider for higher frequency coefficients; and
    an entropy encoder for entropy encoding results of the quantizing.

18. The encoder of claim 17 wherein the quantizing includes:
    computing a deadzone size offset using the measured texture; and
    for each of the plural AC coefficients,
        computing a frequency-dependent weight for the coefficient;
        computing a weighted deadzone size offset by multiplying the deadzone size offset by the frequency-dependent weight; and
        adding the weighted deadzone size offset to an initial deadzone size for the quantizer.

19. A computer-readable non-volatile memory storing instructions for executing a method, the method comprising:
    using a computer, dividing the image or a picture associated with the video information into multiple blocks;
    getting a texture measurement for the image or video information;
    adjusting deadzone size of a quantizer, on a block basis, based at least in part on the texture measurement, so that the deadzone size expands as an amount of texture increases, wherein the texture is related to a smoothness of a block;
    quantizing the image or video information using the quantizer with the adjusted deadzone size to transform the image or video information to a quantized version thereof; and
    performing a frequency transform that produces a DC coefficient and plural AC coefficients, wherein the plural AC coefficients are the information that is quantized and for at least one of the plural AC coefficients, the adjusted deadzone size of the quantizer is also based at least in part on the AC coefficient.

* * * * *